United States Patent

Ishida et al.

[11] Patent Number: 6,069,609
[45] Date of Patent: May 30, 2000

[54] IMAGE PROCESSOR USING BOTH DITHER AND ERROR DIFFUSION TO PRODUCE HALFTONE IMAGES WITH LESS FLICKER AND PATTERNS

[75] Inventors: Katsuhiro Ishida; Toshio Ueda; Masaya Tajima; Yukio Otobe; Masahiro Yoshida; Nobuaki Otaka, all of Kawasaki, Japan

[73] Assignee: Fujitsu Limited, Kawasaki, Japan

[21] Appl. No.: 08/608,526

[22] Filed: Feb. 28, 1996

[30] Foreign Application Priority Data

Apr. 17, 1995 [JP] Japan ................................ 7-090833
Sep. 8, 1995 [JP] Japan ................................ 7-231253

[51] Int. Cl.[7] ......................... G09G 5/10; G06K 9/40; H04N 1/40
[52] U.S. Cl. ......................... 345/147; 382/252; 358/455
[58] Field of Search ................. 345/63, 89, 147, 345/148, 149, 199, 432; 358/455, 456, 457, 458, 465, 466, 530, 536; 382/252, 237, 251

[56] References Cited

U.S. PATENT DOCUMENTS

| | | | |
|---|---|---|---|
| 4,890,167 | 12/1989 | Nakazato et al. | 358/443 |
| 4,956,638 | 9/1990 | Larky et al. | 345/199 |
| 5,014,333 | 5/1991 | Miller et al. | 382/252 |
| 5,031,050 | 7/1991 | Chan | 358/298 |
| 5,077,615 | 12/1991 | Tsujii | 358/298 |
| 5,243,443 | 9/1993 | Eschbach | 358/455 |
| 5,245,444 | 9/1993 | Hashimoto | 358/445 |
| 5,268,774 | 12/1993 | Eschbach | 358/466 |
| 5,351,312 | 9/1994 | Sato et al. | 382/252 |
| 5,455,600 | 10/1995 | Friedman et al. | 345/153 |
| 5,521,989 | 5/1996 | Fan | 382/252 |
| 5,543,855 | 8/1996 | Yamada et al. | |
| 5,563,956 | 10/1996 | Nishikawa et al. | 382/118 |
| 5,596,349 | 1/1997 | Kobayashi et al. | 345/147 |
| 5,757,517 | 5/1998 | Couwenhoven et al. | 382/252 |
| 5,805,126 | 9/1998 | Bassetti | 345/89 |

FOREIGN PATENT DOCUMENTS

| | | |
|---|---|---|
| 264302 | 4/1988 | European Pat. Off. |
| 544511A2 | 6/1993 | European Pat. Off. |
| 545577A2 | 6/1993 | European Pat. Off. |
| 622950A2 | 11/1994 | European Pat. Off. |
| 4065968 | 3/1992 | Japan |
| 4100480 | 4/1992 | Japan |
| 5008457 | 1/1993 | Japan |
| 58487 | 1/1993 | Japan |
| 6332395 | 2/1994 | Japan |
| 07064505 | 3/1995 | Japan |
| 9012388 | 10/1990 | WIPO |

OTHER PUBLICATIONS

C. Billotet et al.; "On the Error Diffusion Technique for Electronic Halftoning"; Proceedings of the S.I.D., vol. 24, No. 3; pp. 253–258; 1983.

Robert W. Floyd et al., "An Adaptive Algorithm for Special Greyscale," Proceeding of the S.I.D., vol. 17/2, Second Quarter, 1976.

Primary Examiner—Jeffery Brier
Assistant Examiner—Paul A. Bell
Attorney, Agent, or Firm—Greer, Burns & Crain, Ltd.

[57] ABSTRACT

An image processing device has an error distribution unit, and a multiplier. The error distribution unit carries out an error distribution operation to artificially increase the number of shades to be displayed on a display. The multiplier multiplies an input signal by a multiplication coefficient, so that the input signal is separated into display data and error data along a bit boundary and the error distribution operation is carried out on the input signal. Further, a semiconductor integrated circuit has a dither pattern generator, an adder, and an error distribution unit. The dither pattern generator stores a plurality of dither patterns in advance and receives an input image signal, the adder receives the input image signal and a pattern signal from the dither pattern generator, and the error distribution unit carries out an error distribution operation on the output of the adder. Therefore, the image processing device can realize a smooth display characteristic for the entire range of input shades.

54 Claims, 37 Drawing Sheets

$E(x,y) = g(x,y) - P$ $E(x,y)$ : ERROR
$g(x,y)$ : ORIGINAL DATA
$P$ : DISPLAY DATA

Fig.16

|  |  | MODE a | | | | | | MODE b | | | | | |
|---|---|---|---|---|---|---|---|---|---|---|---|---|---|
| SHADES | | "ON" SHADES | | | | | | "ON" SHADES | | | | | |
| 28GS | 256GS | 4 | 8 | 2 | 1 | 8 | 4 | 4 | 8 | 2 | 1 | 8 | 4 |
| 0 | 0~7 | | | | | | | | | | | | |
| 1 | 8~15 | | | | O | | | | | | O | | |
| 2 | 16~23 | | O | | | | | | | O | | | |
| 3 | 24~31 | | O | O | | | | | | O | O | | |
| 4 | 32~39 | O | | | | | | | | | | | O |
| 5 | 40~47 | O | | | O | | | | | | O | | O |
| 6 | 48~55 | O | | O | | | | | | O | | | O |
| 7 | 56~63 | O | | O | O | | | | | O | O | | O |
| 8 | 64~71 | O | | | | O | | O | | | | | O |
| 9 | 72~79 | O | | | O | O | | O | | | O | | O |
| 10 | 80~87 | O | | O | | O | | O | | O | | | O |
| 11 | 88~95 | O | | O | O | O | | O | | O | O | | O |
| 12 | 96~103 | | O | | | O | | O | | | | O | |
| 13 | 104~111 | | O | | O | O | | O | | | O | O | |
| 14 | 112~119 | | O | O | | O | | O | | O | | O | |
| 15 | 120~127 | | O | O | O | O | | O | | O | O | O | |
| 16 | 128~135 | | O | | | O | | | O | | | O | |
| 17 | 136~143 | | O | | O | O | | | O | | O | O | |
| 18 | 144~151 | | O | O | | O | | | O | O | | O | |
| 19 | 152~159 | | O | O | O | O | | | O | O | O | O | |
| 20 | 160~167 | O | O | | | O | | | O | | | O | O |
| 21 | 168~175 | O | O | | O | O | | | O | | O | O | O |
| 22 | 176~183 | O | O | O | | O | | | O | O | | O | O |
| 23 | 184~191 | O | O | O | O | O | | | O | O | O | O | O |
| 24 | 192~199 | O | O | | | O | O | O | O | | | O | O |
| 25 | 200~207 | O | O | | O | O | O | O | O | | O | O | O |
| 26 | 208~215 | O | O | O | | O | O | O | O | O | | O | O |
| 27 | 216~255 | O | O | O | O | O | O | O | O | O | O | O | O |

SHADES (INTENSITY LEVELS) →

Fig.18

| 28-SHADE GRAY SCALE | 256-SHADE GRAY SCALE | FLICKER STILL IMAGE | FLICKER DYNAMIC IMAGE |
|---|---|---|---|
| 0 | 0~7 | | |
| 1 | 8~15 | | |
| 2 | 16~23 | | |
| 3 | 24~31 | MEDIUM | |
| 4 | 32~39 | | VERY LARGE |
| 5 | 40~47 | | |
| 6 | 48~55 | | VERY LARGE |
| 7 | 56~63 | | |
| 8 | 64~71 | | |
| 9 | 72~79 | | |
| 10 | 80~87 | | SMALL |
| 11 | 88~95 | SMALL | |
| 12 | 96~103 | | |
| 13 | 104~111 | | |
| 14 | 112~119 | | |
| 15 | 120~127 | | SMALL |
| 16 | 128~135 | | |
| 17 | 136~143 | | |
| 18 | 144~151 | | |
| 19 | 152~159 | | LARGE |
| 20 | 160~167 | | |
| 21 | 168~175 | | |
| 22 | 176~183 | | |
| 23 | 184~191 | | LARGE |
| 24 | 192~199 | | |
| 25 | 200~207 | | |
| 26 | 208~215 | | |
| 27 | 216~255 | | |

Fig.19

| 28-SHADE GRAY SCALE | 256-SHADE GRAY SCALE | OPTIMUM VALUE OF A | 28-SHADE GRAY SCALE | 256-SHADE GRAY SCALE | OPTIMUM VALUE OF A | 28-SHADE GRAY SCALE | 256-SHADE GRAY SCALE | OPTIMUM VALUE OF A |
|---|---|---|---|---|---|---|---|---|
| 0 | 0~7 | 0 | 11 | 88 | 2 | 19 | 155 | 2 |
| 1 | 8~15 | 0 | 11 | 89 | 2 | 19 | 156 | 2 |
| 2 | 16~23 | 0 | 11 | 90 | 2 | 19 | 157 | 2 |
| 3 | 24 | 3 | 11 | 91 | 2 | 19 | 158 | 2 |
| 3 | 25 | 3 | 11 | 92 | 2 | 19 | 159 | 2 |
| 3 | 26 | 3 | 11 | 93 | 2 | 20 | 160~167 | 0 |
| 3 | 27 | 3 | 11 | 94 | 2 | 21 | 168~175 | 0 |
| 3 | 28 | 3 | 11 | 95 | 2 | 22 | 176~183 | 0 |
| 3 | 29 | 3 | 12 | 96~103 | 0 | 23 | 184 | 3 |
| 3 | 30 | 3 | 13 | 104~111 | 0 | 23 | 185 | 3 |
| 3 | 31 | 3 | 14 | 112~119 | 0 | 23 | 186 | 3 |
| 4 | 32~39 | 0 | 15 | 120 | 1 | 23 | 187 | 3 |
| 5 | 40~47 | 0 | 15 | 121 | 1 | 23 | 188 | 3 |
| 6 | 48~55 | 0 | 15 | 122 | 4 | 23 | 189 | 3 |
| 7 | 56 | 1 | 15 | 123 | 3 | 23 | 190 | 3 |
| 7 | 57 | 1 | 15 | 124 | 4 | 23 | 191 | 3 |
| 7 | 58 | 4 | 15 | 125 | 4 | 24 | 192~199 | 0 |
| 7 | 59 | 3 | 15 | 126 | 1 | 25 | 200~207 | 0 |
| 7 | 60 | 4 | 15 | 127 | 1 | 26 | 208~215 | 0 |
| 7 | 61 | 1 | 16 | 128~135 | 0 | 27 | 216~255 | 0 |
| 7 | 62 | 1 | 17 | 136~143 | 0 | | | |
| 7 | 63 | 1 | 18 | 144~151 | 0 | | | |
| 8 | 64~71 | 0 | 19 | 152 | 2 | | | |
| 9 | 72~79 | 0 | 19 | 153 | 2 | | | |
| 10 | 80~87 | 0 | 19 | 154 | 2 | | | |

Fig.32
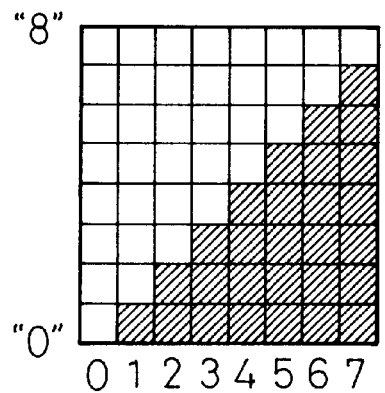
Fig.33
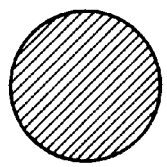  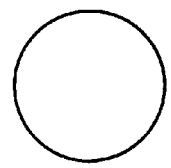
EVENT A    EVENT B
IF THE PROBABILITY OF
EVENT A IS 40% AND THAT
OF EVENT B IS 60%, THE
PROBABILITIES OF CHANGES
ARE AS FOLLOWS:
A TO B =4/10·6/10=24/100
B TO A =6/10·4/10=24/100
A TO A =4/10·4/10=16/100
B TO B =6/10·6/10=36/100
CHANGE =48%
NO CHANGE =52%

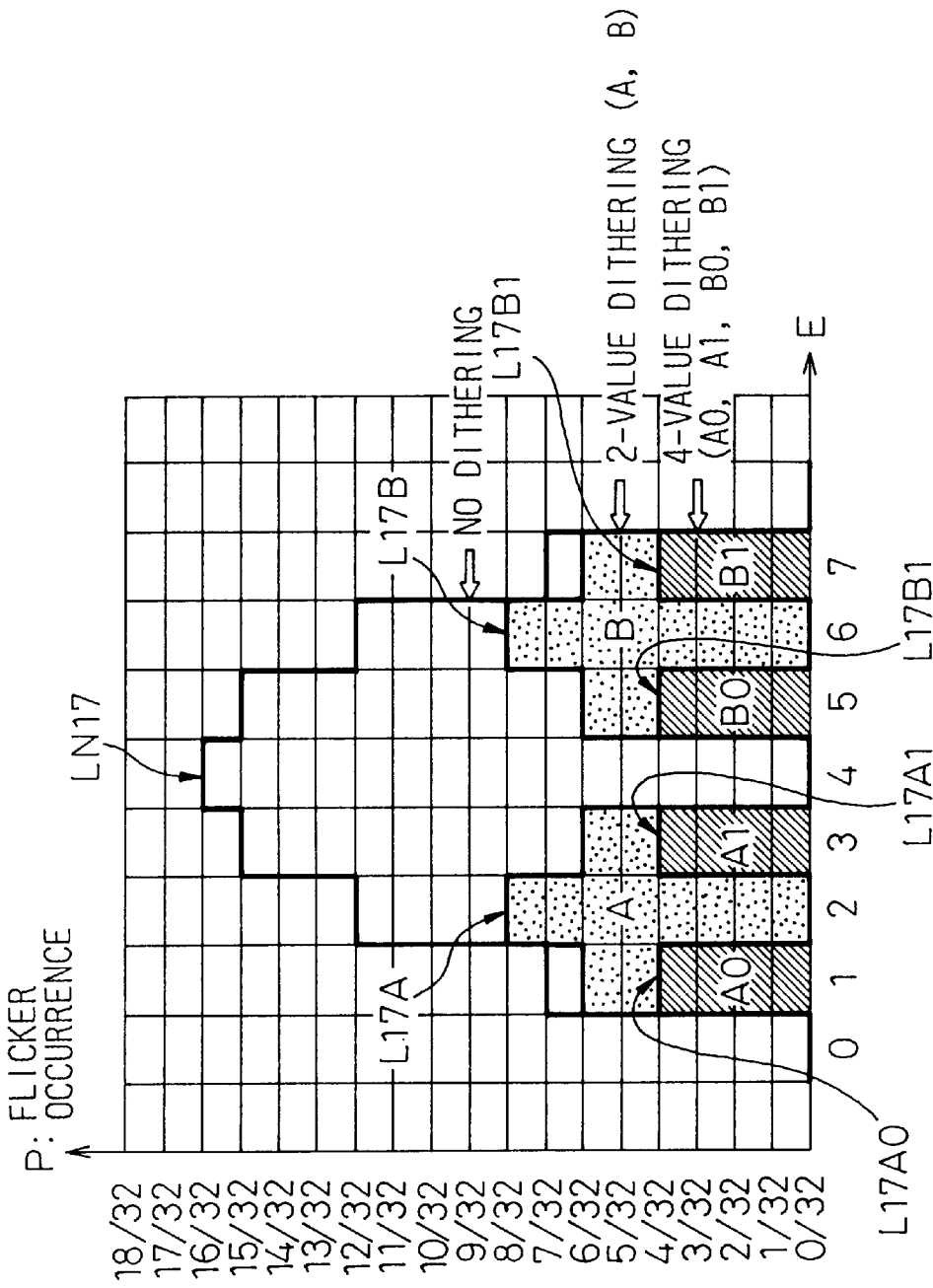

NO DITHERING
P = 32.8 %

2-VALUE DITHERING
P = 15.6 %

4-VALUE DITHERING
P = 4/32 · 1/8 · 4
= 16/256
= 6.2 %

8-VALUE DITHERING
P = 0 %

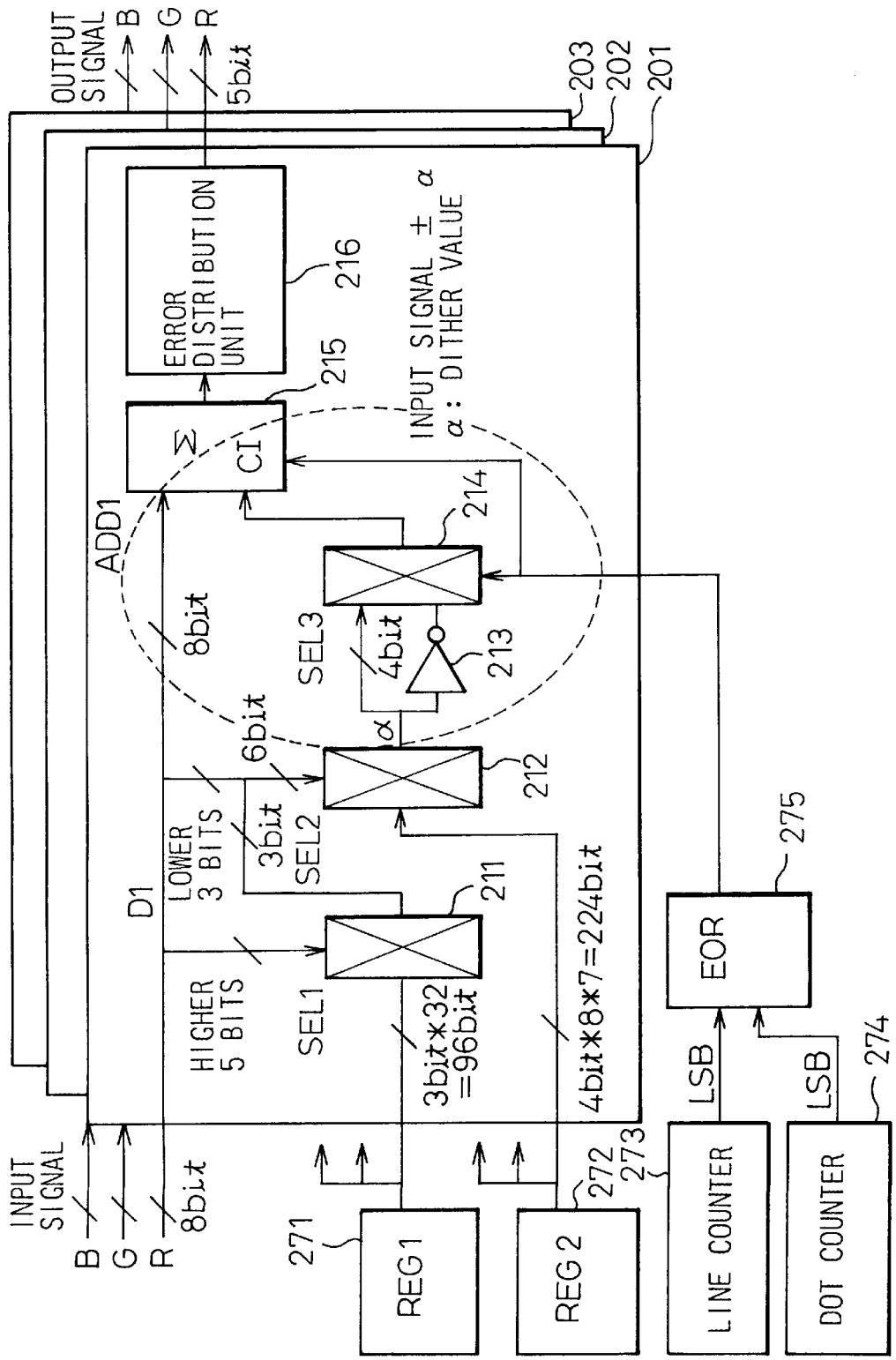

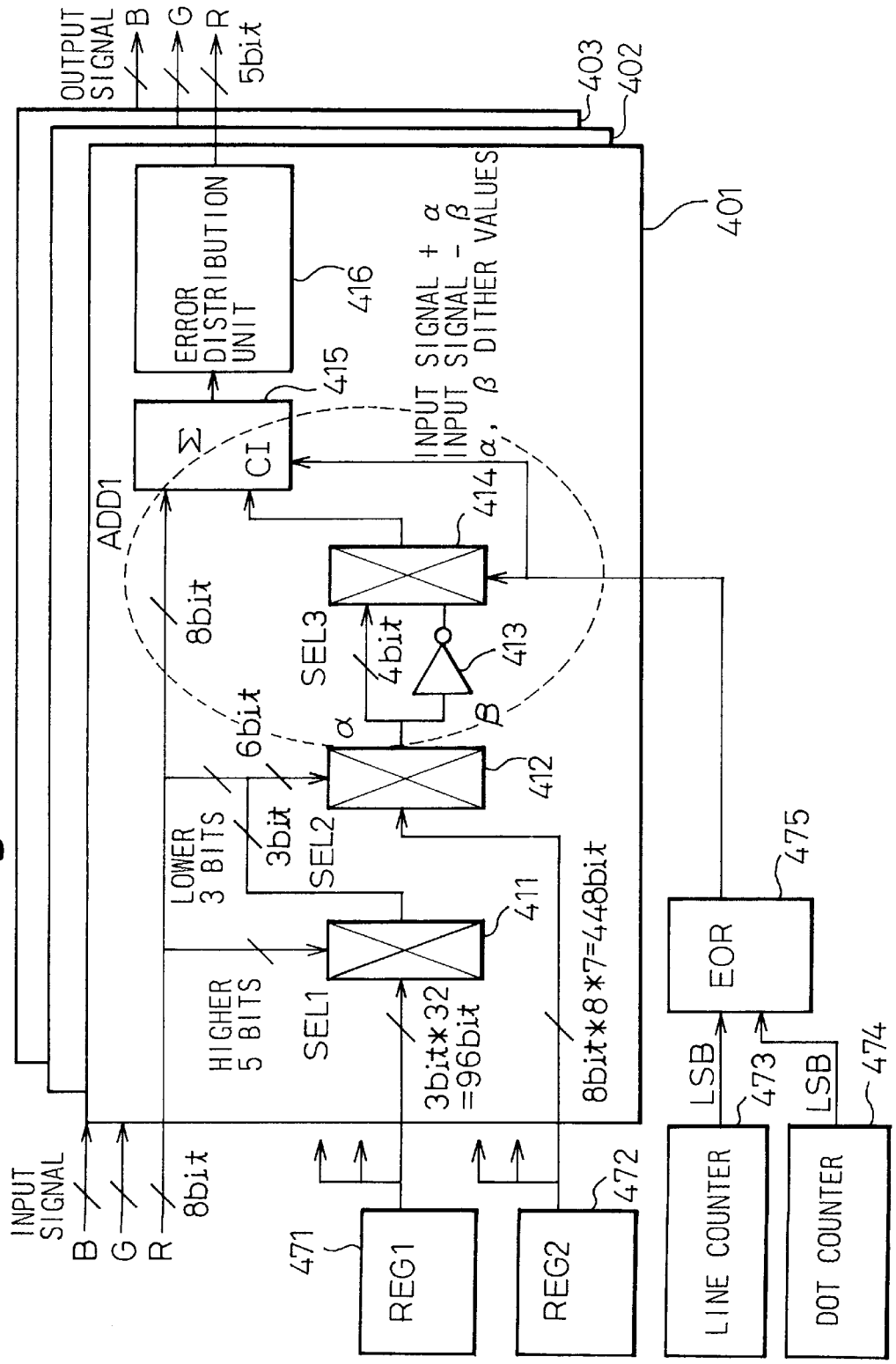

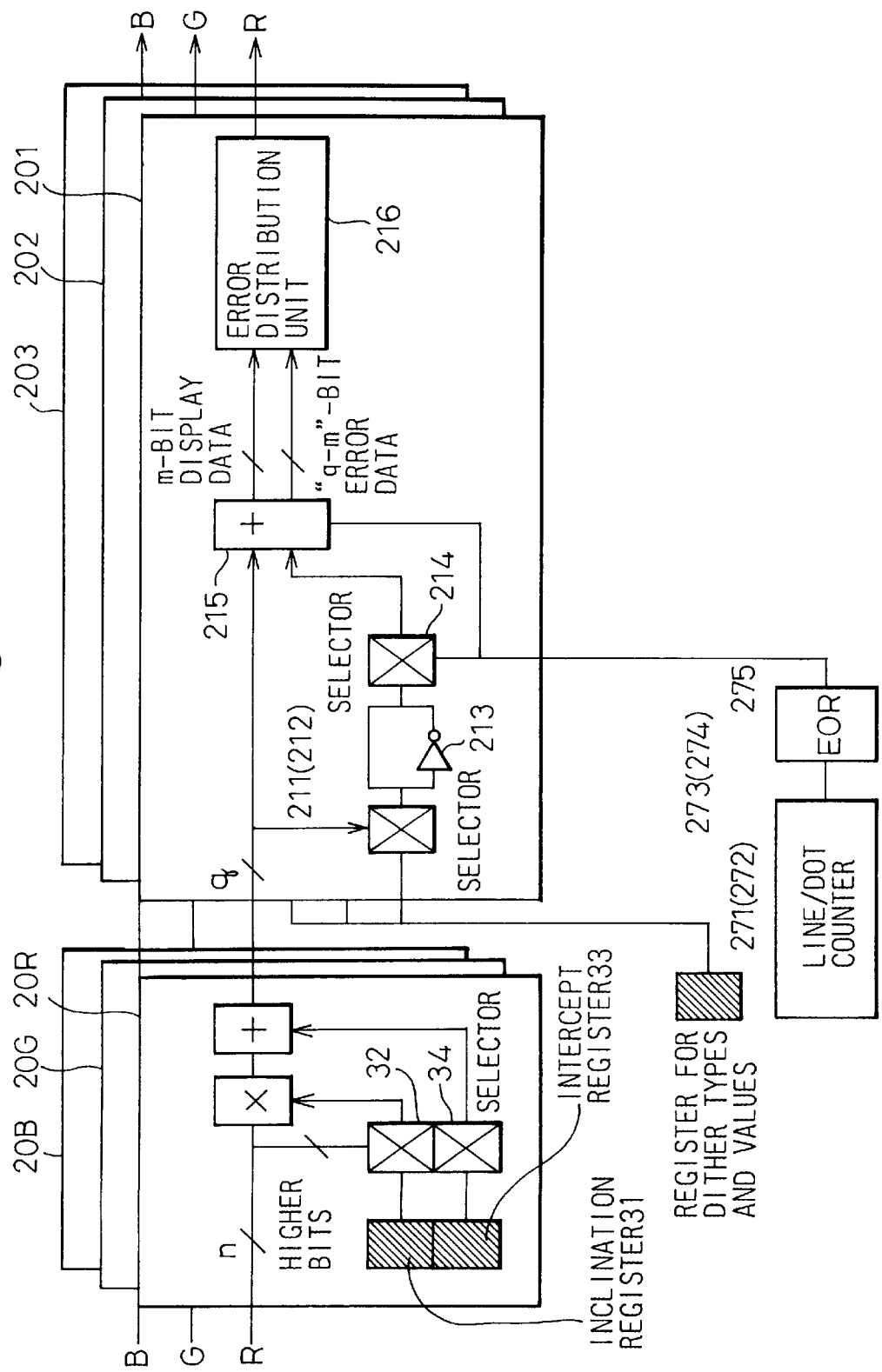

IMAGE PROCESSOR USING BOTH DITHER AND ERROR DIFFUSION TO PRODUCE HALFTONE IMAGES WITH LESS FLICKER AND PATTERNS

BACKGROUND OF THE INVENTION

1. Field of the Invention

The present invention relates to an image processing device and method for displaying a half tone image, and more particularly, to an image processing device and a method for artificially increasing the number of shades to display by distributing an error between an original image and a display image.

2. Description of the Related Art

Recently, displays have become very important for man-machine interfaces in an advanced information society, and thin, light-weight, flat display panels are in strong demand. These display panels are, for example, plasma display panels (PDPs), electronic luminescence (EL) panels, fluorescent display panels, or liquid crystal display (LCD) panels.

The display panels presently marketed have a problem in display quality. In particular, they have a problem in displaying a halftone image involving shades or gradations. Among the display panels, the plasma display panels are drawing attention because they are capable of providing a large screen and displaying a clear image. In the plasma display panel, recently, higher level gray scales in many display lines has become necessary with the requirements of a larger display size, a larger number of pixels (cells) and full color display in a display panel.

Conventionally, there are several techniques to display shades on a display panel. One of the techniques is dithering, which artificially increases the number of shades to display with the use of patterns of pixels. Dithering has a problem of producing peculiar patterns and lowering resolution.

Another technique is "error distribution," which increases the number of shades to display by adding or subtracting an error in an input signal for a given pixel to or from peripheral pixels. The error distribution is frequently used to display a natural image on a PDP whose original number of shades is small.

The error distribution, however, causes flicker and peculiar patterns on the PDP. It is necessary, therefore, to provide a technique of increasing the number of shades to be displayed on the PDP without flicker or peculiar patterns.

The problems in the prior art will be explained later with reference to the accompanying drawings.

SUMMARY OF THE INVENTION

An object of the present invention is to provide an image processing device (apparatus) capable of displaying many shades of good quality through error distribution. Another object of the present invention is to provide an image processing device and a method for displaying shades on a matrix panel such as a PDP without causing flicker or peculiar patterns.

According to the present invention, there is provided an image processing device comprising an error distribution unit for carrying out an error distribution operation to artificially increase the number of shades to be displayed on a display; and a multiplier for multiplying an input signal by a multiplication coefficient, so that the input signal is separated into display data and error data along a bit boundary and the error distribution operation is carried out on the input signal, to realize a smooth display characteristic for the entire range of input shades.

The error distribution unit may carry out the error distribution operation on an n-bit-quantized signal (representing an integer in the range of 0 to $2^{n-1}$), so that the display whose original number of shades may be represented with m bits (m<n) and be equal to or less than $2^m$ in order to artificially increase the number of shades.

The image processing device may further comprise a register for storing multiplication coefficients; and a selector for selecting an optional one of the multiplication coefficients stored in the register. The image processing device may further comprise an adder disposed between the multiplier and the error distribution unit, to add an addition coefficient to the output of the multiplier. The image processing device may further comprise a register for storing addition coefficients; and a selector for selecting an optional one of the addition coefficients stored in the register.

The multiplication and addition coefficients may correspond to the inclination and intercept of a linear approximate expression representing an inversion of a nonlinear characteristic of the display, and may be changed in response to a specific signal, to correct for the nonlinear characteristic of the display. The signal for changing the multiplication and addition coefficients may comprise higher bits of the input signal.

The addition coefficients stored in the register may be y-axis intercepts of $2^h$ linear approximate expressions defined with higher h bits. The addition coefficients stored in the register may be y values on left edges of $2^h$ rectangular regions defined by higher h bits, to reduce the number of bits of a multiplicand handled by the multiplier from n to "n–h", to thereby reduce the circuit size of the image processing device.

The multiplier may be arranged in front of the error distribution unit. The image processing device may be constituted as a semiconductor integrated circuit.

According to the present invention, there is also provided an image processing device having processors for red, green, and blue, respectively, the processors receiving n-bit-quantized red, green, and blue signals, which each represent an integer in the range of 0 to $2^{n-1}$, respectively, and carry out an error distribution operation to artificially display many shades on a display which is originally capable of displaying m-bit shades (m<n) equal to or less than $2^m$ for each of the red, green, and blue wherein each of the processors comprises a multiplier for multiplying an input signal by a multiplication coefficient; a first register for storing the multiplication coefficients; a first selector for selecting a proper one of the multiplication coefficients stored in the first register; an adder disposed between the multiplier and the error distribution unit, to add an addition coefficient to an output of the multiplier; a second register for storing the addition coefficients; and a second selector for selecting a proper one of the addition coefficients stored in the second register, each of the processors separating the input signal into display data and error data along a bit boundary, to carry out the error distribution operation and provide a smooth display characteristic for the entire range of input shades. The first and second registers of the processors may store different coefficients for the red, green, and blue, respectively, to correct a color imbalance due to fluctuations in red, green, and blue phosphorescent materials.

Further, according to the present invention, there is provided an image processing device comprising an error distribution unit for carrying out an error distribution operation to artificially increase the number of shades to be displayed on a display; and a dither processor, for adding or subtracting a dither value to or from an input signal, to convert error data, which easily cause a state transition, into data that hardly cause the state transition, to thereby suppress flicker.

The dither processor may comprise a dither table for storing dither values to be applied to the input signal that easily causes flicker; and a dithering unit for adding or subtracting the output of the dither table to or from the input signal. The dithering unit may comprise a selector for alternately providing inverted and non-inverted signals line by line and pixel by pixel; a multiplier for multiplying the output of the dither table by the output of the selector; and an adder for adding the output of the multiplier to the input signal. The selector may control the inverted and non-inverted signals in response to a signal formed of an exclusive OR of the least significant bit of a line counter and the least significant bit of a dot counter.

The dither table may comprise a first register for storing a plurality of types of dither values; and a second register for specifying an optimum one of the dither values stored in the first register. The first register may store dither values to be added to or subtracted from the input signal. The first register may store first dither values to be added to the input signal as well as second dither values to be subtracted from the input signal.

The dither processor may be disposed in front of the error distribution unit. The image processing device may be constituted as a semiconductor integrated circuit.

Further, according to the present invention, there is also provided an image processing device having processors for red, green, and blue, respectively, the processors receiving n-bit-quantized red, green, and blue signals, which represent each an integer in the range of 0 to $2^{n-1}$, respectively, and carrying out error distribution to artificially display many shades on a display which was originally capable of displaying m-bit shades (m<n) equal to or less than $2^m$ for each of the red, green, and blue, wherein each of the processors comprises an error distribution unit for carrying out an error distribution operation to artificially increase the number of shades to be displayed on the display; and a signal processor, for adding or subtracting a dither value to or from the input signal, to convert error data, which easily cause a state transition, into data that hardly cause the state transition, to thereby suppress flicker.

The dither table may comprise a first register for storing a single type of dither values; and a second register for determining whether or not the dither values stored in the first register must be applied to the input signal, in accordance with the shade of the input signal.

According to the present invention, there is provided a plasma display panel having an image processing device, for displaying a shade as an optional combination of subframes having different lighting periods according to weighted bits, wherein the image processing device comprises an error distribution unit for carrying out an error distribution operation to artificially increase the number of shades to be displayed on a display; and a multiplier arranged in front of the error distribution unit, for multiplying an input signal by a multiplication coefficient, so that the input signal is separated into display data and error data along a bit boundary and the error distribution operation is carried out on the input signal, to realize a smooth display characteristic for the entire range of input shades.

According to the present invention, there is also provided a semiconductor integrated circuit comprising a dither pattern generator for storing a plurality of dither patterns in advance and receiving an input image signal; an adder for receiving the input image signal and a pattern signal from the dither pattern generator; and an error distribution unit for carrying out an error distribution operation on the output of the adder.

The dither pattern generator may receive a control signal output from a timing generator in response to input control signals, and the error distribution unit may carry out the error distribution operation unit may carry out the error distribution operation in response to the control signal from the timing generator.

The semiconductor integrated circuit may be used to drive a display having a two-dimensional matrix of pixels to be driven according to the output of the timing generator and the output of the error distribution unit.

Further, according to the present invention, there is provided a display panel comprising a timing generator for providing control signals in response to input control signals; a dither pattern generator for storing a plurality of dither patterns in advance and receiving the control signal from the timing generator as well as an input image signal; an adder for receiving the input image signal and a pattern signal from the dither pattern generator; an error distribution unit for carrying out an error distribution operation on the output of the adder in response to the control signal from the timing generator; and a display having a two-dimensional matrix of pixels to be driven according to the output of the timing generator and the output of the error distribution unit.

According to the present invention, there is also provided a plasma display panel, having an image processing device, for displaying a shade as an optional combination of subframes having different lighting periods according to weighted bits, the image processing device including processors for red, green, and blue, respectively, the processors receiving n-bit-quantized red, green, and blue signals, which each represent an integer in the range of 0 to $2^{n-1}$, respectively, and carrying out an error distribution operation to artificially display many shades on a display which is originally capable of displaying m-bit shades (m<n) equal to or less than $2^m$ for each of the red, green, and blue, wherein each of the processors comprises a multiplier for multiplying an input signal by a multiplication coefficient; a first register for storing the multiplication coefficients; a first selector for selecting a proper one of the multiplication coefficients stored in the first register; an adder disposed between the multiplier and the error distribution unit, to add an addition coefficient to an output of the multiplier; a second register for storing the addition coefficients; and a second selector for selecting a proper one of the addition coefficients stored in the second register, each of the processors separating the input signal into display data and error data along a bit boundary, to carry out an error distribution operation and provide a smooth display characteristic for the entire range of input shades.

Further, according to the present invention, there is provided a plasma display panel, having an image processing device, for displaying a shade as an optional combination of subframes having different lighting periods according to weighted bits, wherein the image processing device comprises an error distribution unit for carrying out an error distribution operation to artificially increase the number of shades to be displayed on a display; and a dither processor, for adding or subtracting a dither value to or from an input signal, to convert error data, which easily cause a state transition, into data that hardly cause the state transition, to thereby suppress flicker.

Further, according to the present invention, there is also provided a plasma display panel having an image processing device, for displaying a shade as an optional combination of subframes having different lighting periods according to weighted bits, the image processing device including processors for red, green, and blue, respectively, the processors receiving n-bit-quantized red, green, and blue signals, which represent each an integer in the range of 0 to $2^{n-1}$, respectively, and carrying out error distribution to artificially display many shades on a display which was originally capable of displaying m-bit shades (m<n) equal to or less than $2^m$ for each of the red, green, and blue, wherein each of the processors comprises an error distribution unit for carrying out an error distribution operation to artificially increase the number of shades to be displayed on the display; and a signal processor, for adding or subtracting a dither value to or from the input signal, to convert error data, which easily cause a state transition, into data that hardly cause the state transition, to thereby suppress flicker.

In addition, according to the present invention, there is provided a method of displaying a halftone image on a display having a plurality of pixels arranged in two-dimensional matrix configuration, comprising the steps of inputting a halftone image data representing a shade and being constituted for each pixel: adding a dither pattern to the input halftone image data appropriate thereof; and carrying out an error distribution operation on the dither-pattern-added input halftone image data.

A plurality of dither patterns may be previously prepared, and at least one of the dither patterns may be selected and used in accordance with the input halftone image data. The dither pattern may comprise two alternate thresholds of opposite polarities. The dither pattern to be added to the input halftone image data may be selected from a plurality of different types of dither patterns and used in accordance with the input halftone image data at a specific time interval. The dither pattern to be added to the input halftone image data may be selected from a plurality of different types of dither patterns and used in accordance with the input halftone image data at a plurality of spatial positions.

The method may be applied to a halftone image data representing the shade just before a shade of (4n-1). The shade just before the shade of (4n-1) may be just before a bit representing high brightness.

BRIEF DESCRIPTION OF THE DRAWINGS

The present invention will be more clearly understood from the description of preferred embodiments as set forth below, with reference to the accompanying drawings, wherein:

FIG. 16 shows sequences of activating subframes according to a method of displaying a halftone image of the present invention;

FIG. 18 shows flicker levels according to the method of FIG. 16;

FIG. 19 shows optimum dither thresholds based on FIG. 18;

FIG. 32 shows relationships between error data and flicker;

FIG. 33 explains the probabilities of changes between two events;

FIG. 36 explains reducing flicker according to the second aspect of the present invention;

FIG. 38 is a block diagram showing an image processing apparatus according to a first embodiment of the second aspect of the present invention;

FIG. 40 is a block diagram showing an image processing apparatus according to a third embodiment of the second aspect of the present invention; and FIG. 41 is a block diagram showing an image processing apparatus according the first and second aspects of the present invention.

DESCRIPTION OF THE PREFERRED EMBODIMENTS

For a better understanding of the preferred embodiments of the present invention, the problem in the prior art will be explained with reference to the drawings.

Figure 1:
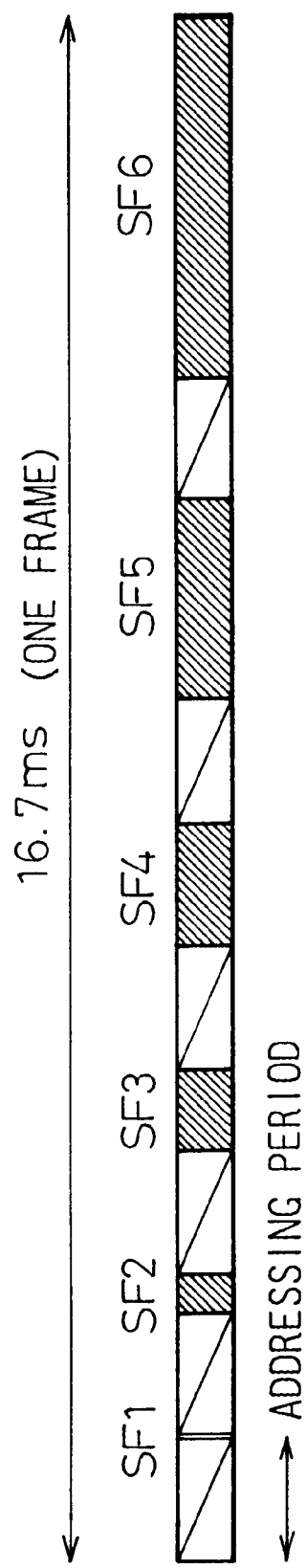
FIG. 1 shows a technique of displaying shades on a PDP.

FIG. 1 shows a technique of realizing shades on a plasma display panel (PDP).

A frame is divided into six subframes SF1 to SF6. The ratio of the lighting periods of the subframes SF1 to SF6 is, for example, 1:2:4:8:16:32. Any combination of ON and OFF states of these subframes is represented with six bits to realize 64 shades. Namely, each pixel of the PDP is provided with a 6-bit signal, and all pixels are simultaneously driven according to the signals.

To increase the number of shades to display on the PDP, it is necessary to increase the number of subframes. Each subframe, however, must have an addressing period to specify pixels to be turned ON. Therefore, increasing the number of subframes may extend a total addressing period in a frame whose period is, for example, 16.7 ms. This results in shortening a total lighting period, to thereby drop the brightness of the PDP. Under the present display technology, the maximum number of subframes is about six.

To display a natural image such as a television image on the PDP, it is necessary to employ a technique of artificially realizing shades, i.e., gradations or halftones. Error distribution is an effective technique of artificially providing many shades to display a natural image. This technique is widely used for PDPs and liquid crystal displays (LCDs).

Figure 2:
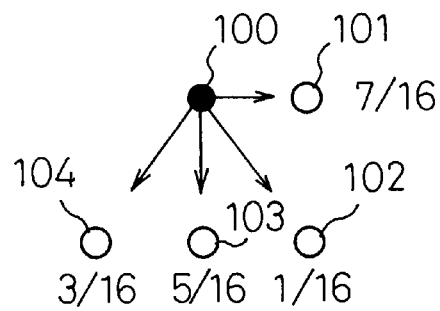
FIG. 2 explains distributing an error to peripheral pixels.

FIG. 2 explains the error distribution. A black pixel 100 is a target pixel, and white pixels 101 to 104 are peripheral pixels to which an error is distributed.

An error between an original shade assigned to the pixel 100 and the threshold of the pixel 100 is distributed to the peripheral pixels 101 to 104, thereby artificially realizing the original shade. The PDP containing these pixels is capable of displaying, for example, 64 shades.

The original shade assigned to the pixel 100 is g(x, y). The threshold of the pixel 100 is P. An error E(x, y) between the original shade g(x, y) and the threshold P is distributed to the peripheral pixels 101 to 104. The threshold of the pixel 100 is selected to minimize the error E(x, y). The error E(x, y) is distributed to the peripheral pixels 101 to 104 at a given ratio. In this example, 7/16 of the error is distributed to the pixel 101, 1/16 of the error to the pixel 102, 5/16 of the error to the pixel 103, and 3/16 of the error to the pixel 104.

Figure 3:
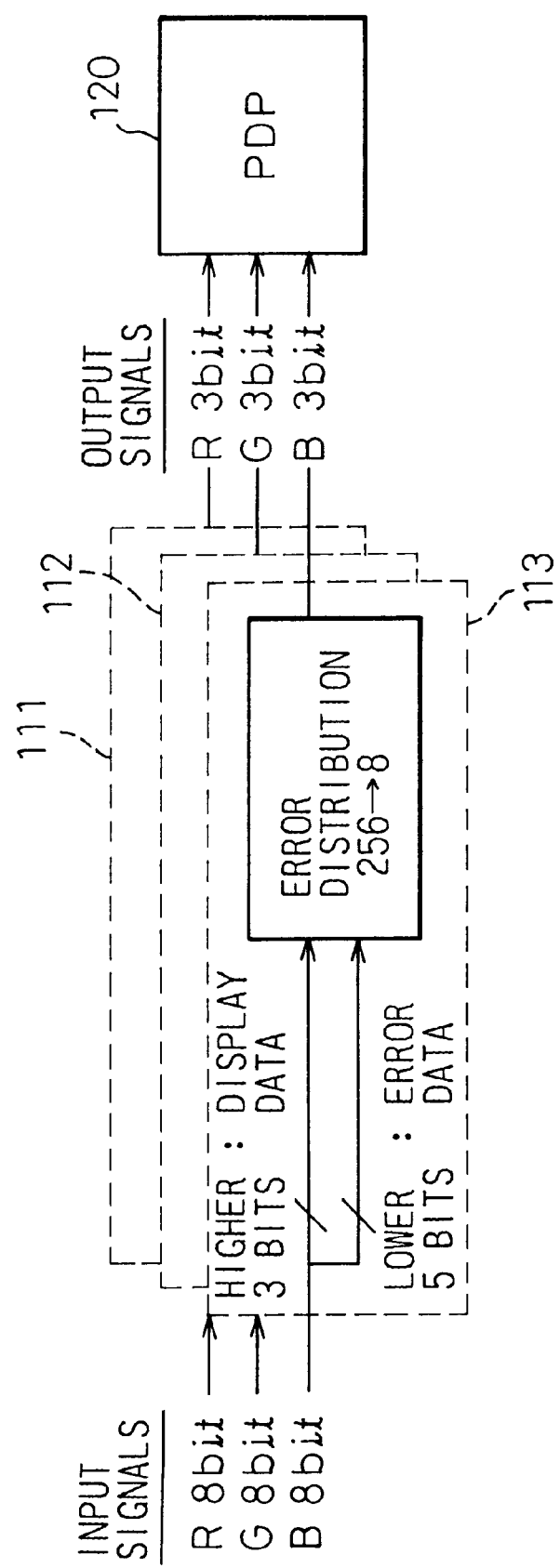
FIG. 3 is a block diagram showing a color PDP with error distribution.
Figure 4:
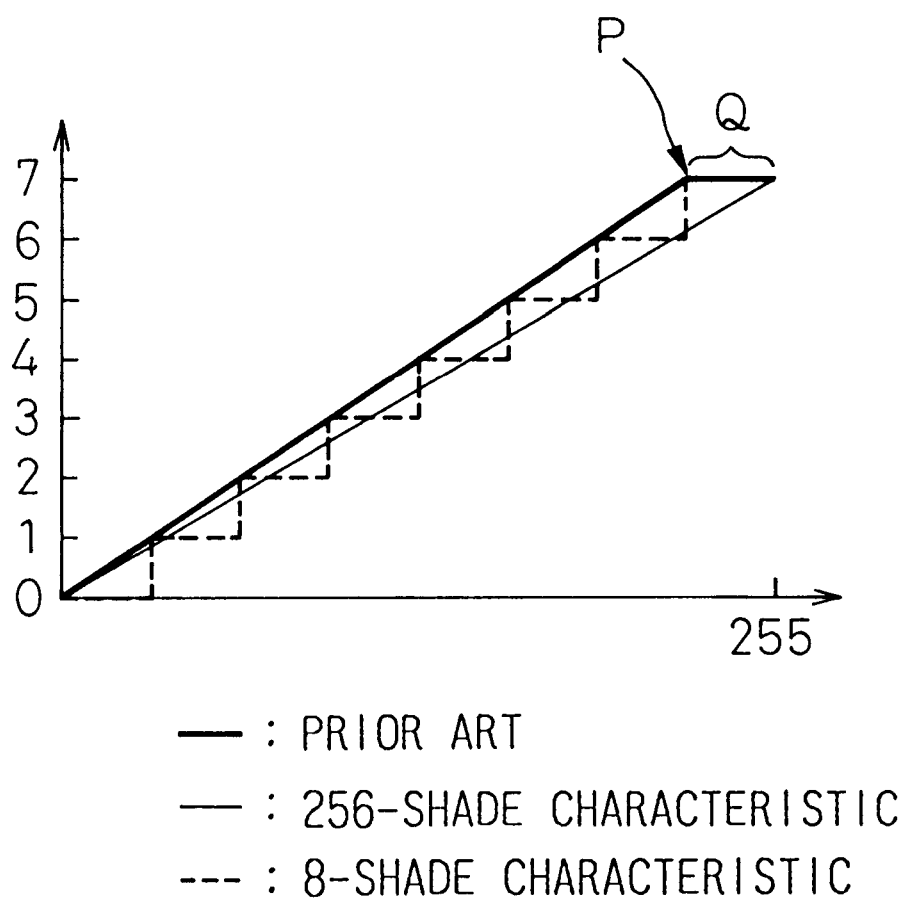
FIG. 4 shows display characteristics with and without error distribution.

FIG. 3 is a block diagram showing a color PDP 120 employing the error distribution. FIG. 4 shows the display characteristics of the PDP with and without the error distribution. Eight-bit input signals are provided for red (R), green (G), and blue (B), respectively. Each of the 8-bit input signals represents any one of 256 shades. Three-bit output signals for R, G, and B, respectively, are provided for the PDP 120. Each of the 3-bit output signals represents any one of 8 shades.

Namely, the PDP 120 is originally capable of displaying 8 shades. A frame is divided into subframes, and the ratio of the lighting periods of the subframes is set according to powers of 2. Among eight bits of an input signal given to each pixel of the PDP 120, the higher three bits (equal to the display capacity of the PDP) are used as display data and the remaining five as error data.

FIG. 4 shows display characteristics. A dotted line represents the display characteristic of the PDP 120 when no error distribution is carried out. The dotted line involves eight steps corresponding to shades 0 to 7. A thick line represents the display characteristic of the PDP 120 when the error distribution is carried out. The thick line is smooth.

The thick line of FIG. 4 of the prior art, however, is saturated at a point P. This is because the input signal is based on the 256-shade scale (a thin line in FIG. 4) ranging from "00000000" to "11111111" and because the prior art employs the higher three bits of the input signal as display data and the remaining five bits as error data to be distributed. A saturated part Q starting from the point P shrinks as the number of shades the PDP 120 can originally display increases. If the PDP 120 can display 64 shades (represented with six bits), the saturated part Q will extend for 1/64 of 256 shades. In this case, the display characteristic of the PDP 120 is slightly steeper than the thin line of FIG. 4 with a slightly strong contrast and good display quality.

To realize 64 shades, a frame is divided into six subframes SF1 to SF6 as explained with reference to FIG. 1. The lighting periods of the subframes SF1 to SF6 are determined according to powers of 2 as listed in Table 1. The lighting periods correspond to shades, or intensity or brightness levels, respectively.

TABLE 1

| Subframe | SF1 | SF2 | SF3 | SF4 | SF5 | SF6 |
|---|---|---|---|---|---|---|
| Intensity Level | 1 | 2 | 4 | 8 | 16 | 32 |

These subframes are combined in various ways to realize 64 shades. For example, shade 31 is realized by lighting the subframes SF1 to SF5, and shade 32 by lighting the subframe SF6. When the shade of a given pixel of the PDP changes from 31 to 32, flicker or color shift may occur because the intervals of lighting the subframes greatly differ between shades 31 and 32. The flicker or color shift will be worsened if the error distribution is applied to the pixel, because the flicker or color shift is transferred to the peripheral pixels to which an error is distributed. This results in deteriorating display quality.

Since the intervals of turning ON and OFF the subframes greatly differ from shade to shade, a single dither pattern is insufficient to minimize flicker when many shades, for example, 256 shades must be displayed in a single frame. Adopting several dither patterns at fixed positions in a frame is impractical because the shade of each pixel changes frequently depending on input signals.

The error distribution is effective to artificially form many shades with the limited number of shades a display can originally provide. The error distribution, however, has several problems when applied to a display such as a PDP that mainly displays dynamic images. The problems are as follows:

(1) Distortion of display characteristic i) Saturation of brightness

As explained above, the number of subframes contained in a frame of a PDP must be reduced to increase the brightness of the PDP. According to the present display technology, the number of subframes in a frame of 16.7 ms is usually six. If it is required to improve the brightness of the PDP further, the number of subframes must be reduced further. Reducing the number of subframes, however, causes a reduction in the number of shades the PDP can originally display. Although the saturated part Q of FIG. 4 is ignorable when the number of shades the PDP can originally display is 64 (represented with six bits), the part Q will be influential if the number of subframes is reduced. This results in deteriorating the display quality of the PDP.

ii) Flatness

When a frame has six subframes, the ratio of the lighting periods of the subframes may be 4:8:1:2:8:4, to improve the ability of displaying dynamic images on the PDP. In this case, the number of shades the PDP can originally display is 28 ranging from shade 0 to shade 27.

Figure 5:
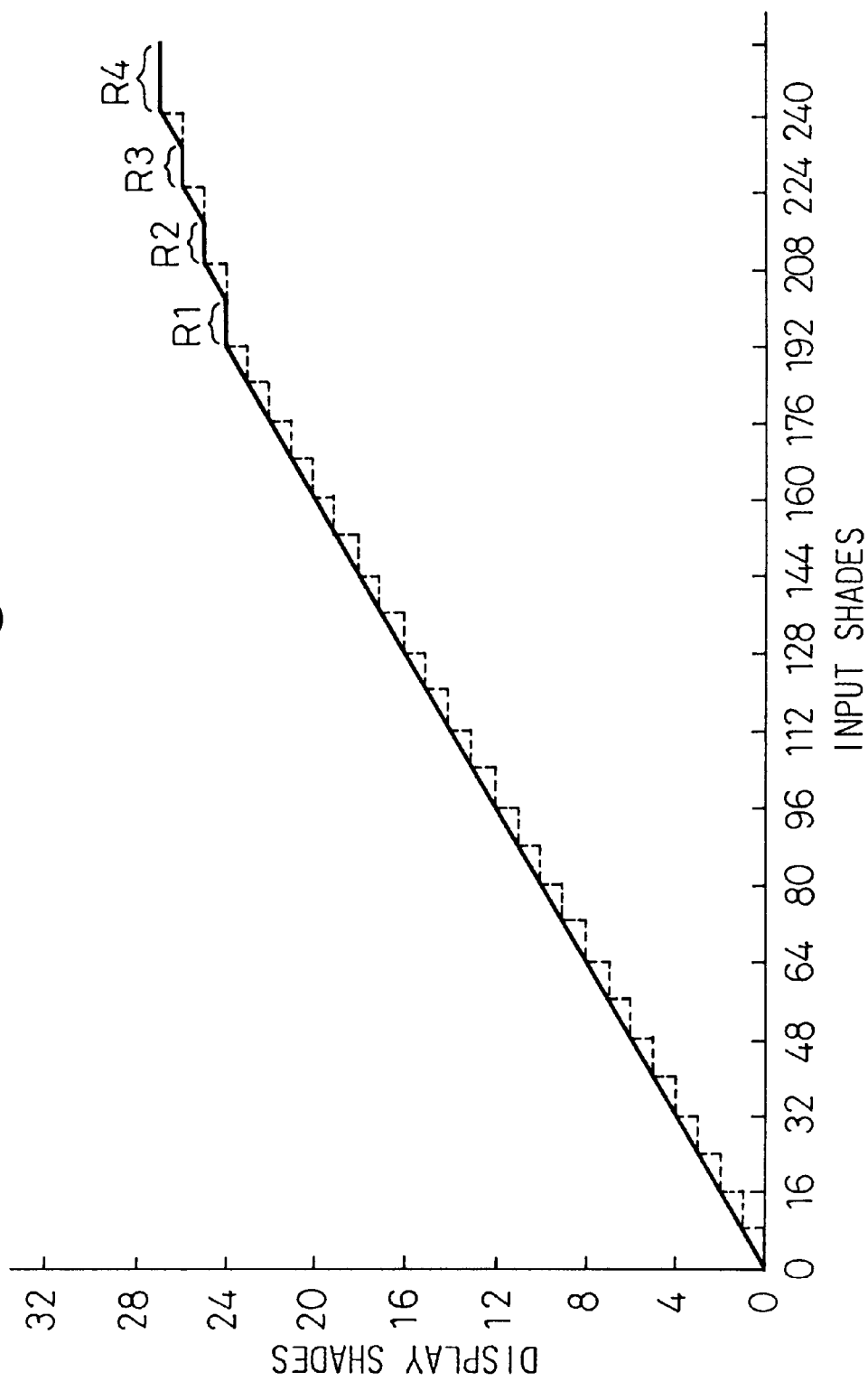
FIG. 5 shows a display characteristic with the error distribution.
Figure 6:
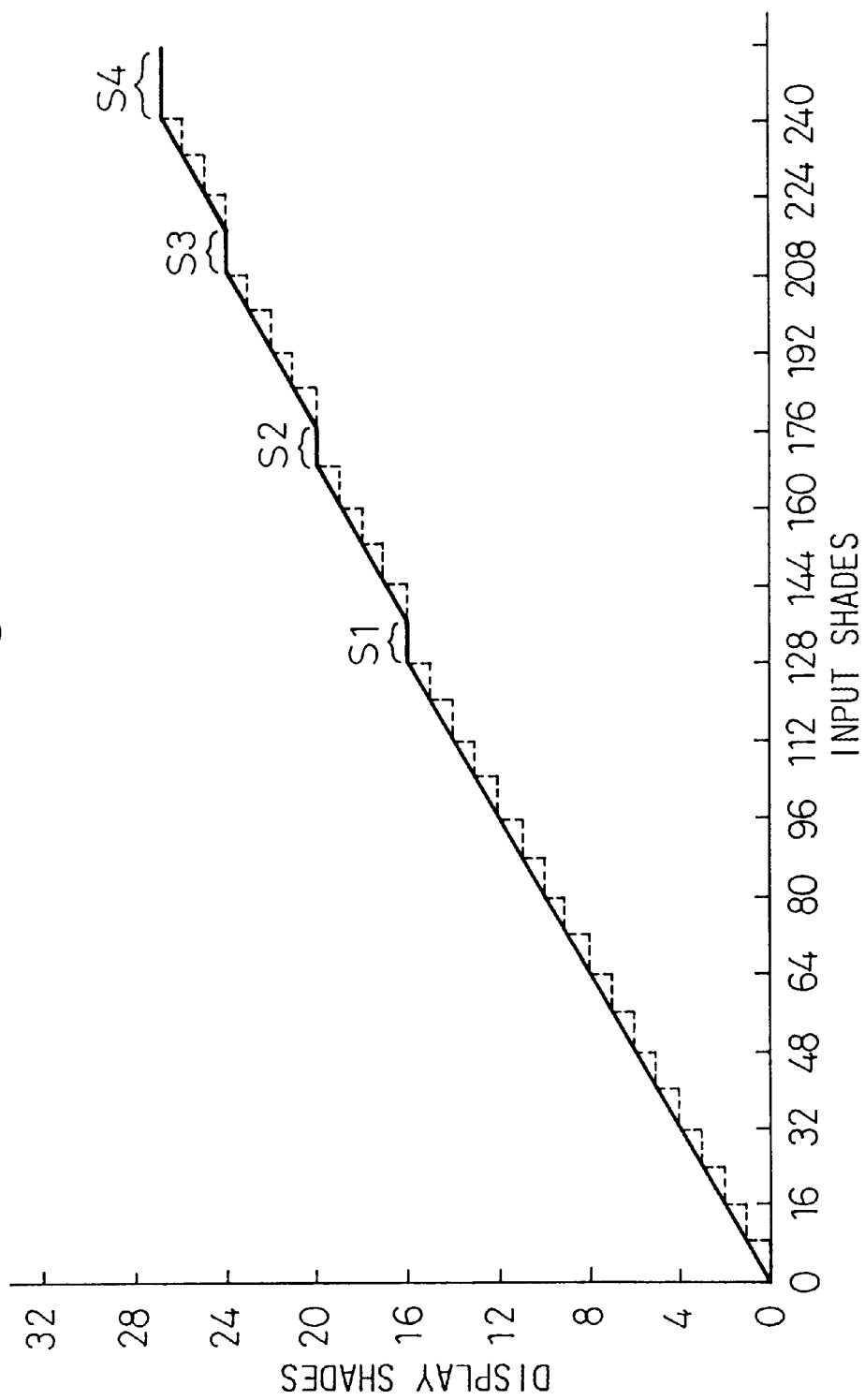
FIG. 6 shows a display characteristic with error distribution.

When the number of shades the PDP can originally display is $2^n$ where n is the number of subframes contained in a frame, a part where the brightness of the PDP is flat is 1/2" of the total number of shades an input signal can represent. If the number of subframes is five to provide 32 shades (represented with five bits), the flat part will be 1/32. However, if the lighting periods of the five subframes are configured to provide 28 shades, the flat part will be expanded to 5/32. FIGS. 5 and 6 show a 5/32-flat-part caused when displaying a 256-shade image on the PDP that is capable of providing 28 shades represented with five bits, i.e., five subframes in a frame.

In FIG. 5, flat parts R1 to R4 forming 5/32 of a total span of 256 shades collectively appear in a region of higher shades. In FIG. 6, flat parts S1 to S4 forming 5/32 of a total span of 256 shades scatter along the span. In each case, the flat parts distort shades and deteriorate display quality.

(2) Flicker

The PDPs realize shades with combinations of the different lighting periods of subframes as mentioned above. The temporal positions of subframes to be turned ON vary depending on a shade to display. In particular, the LSB (least significant bit) of a display signal influences the positions of subframes to be turned ON. A fluctuation in the positions of subframes to be turned ON causes flicker whose frequency is lower than a frame frequency of, for example, 60 Hz, to deteriorate display quality.

Figure 7:
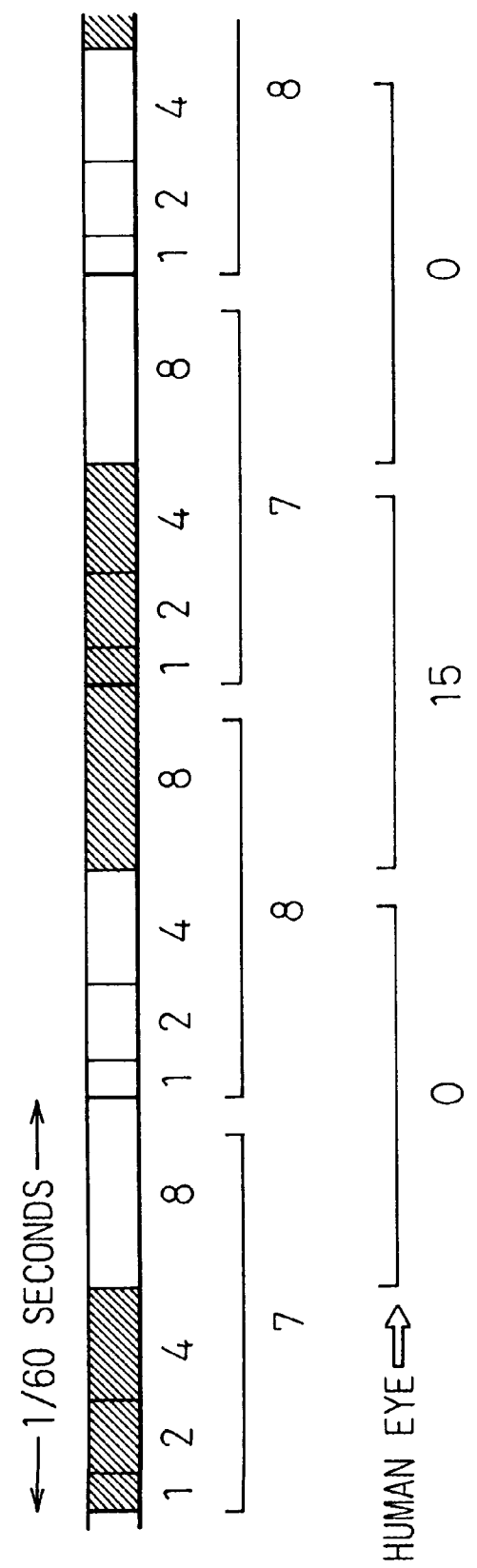
FIG. 7 explains flicker on a PDP.

FIG. 7 explains flicker on a PDP. Each frame involves four subframes, and the lighting periods thereof are set to 1:2:4:8 to realize 16 shades ranging from shade 0 to shade 15.

If the shade of a given pixel of the PDP alternates between shades 7 and 8 in successive frames, the human eye will sense an alternation of shades 0 and 15 at a frequency of 30 Hz as shown in FIG. 7. This is the flicker.

Figure 8:
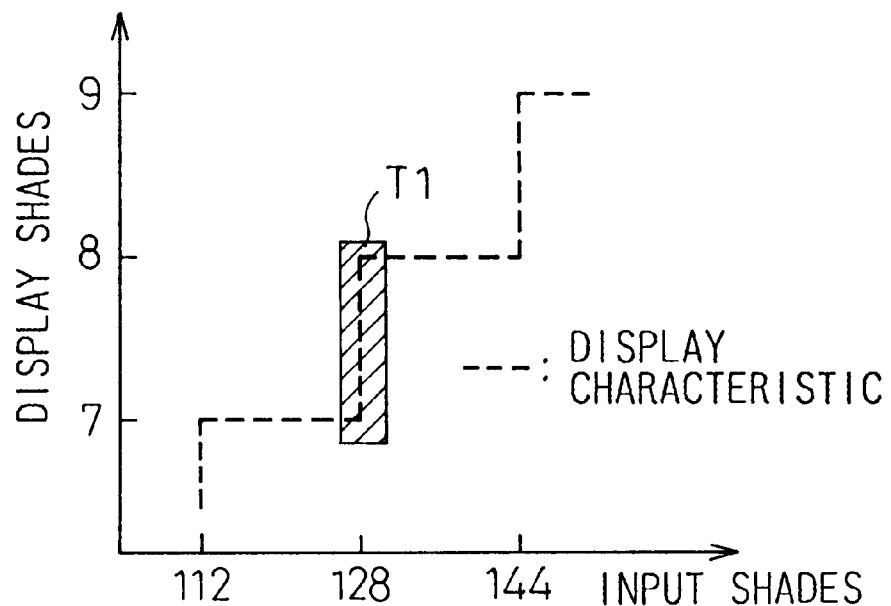
FIG. 8 explains flicker without error distribution.
Figure 9:
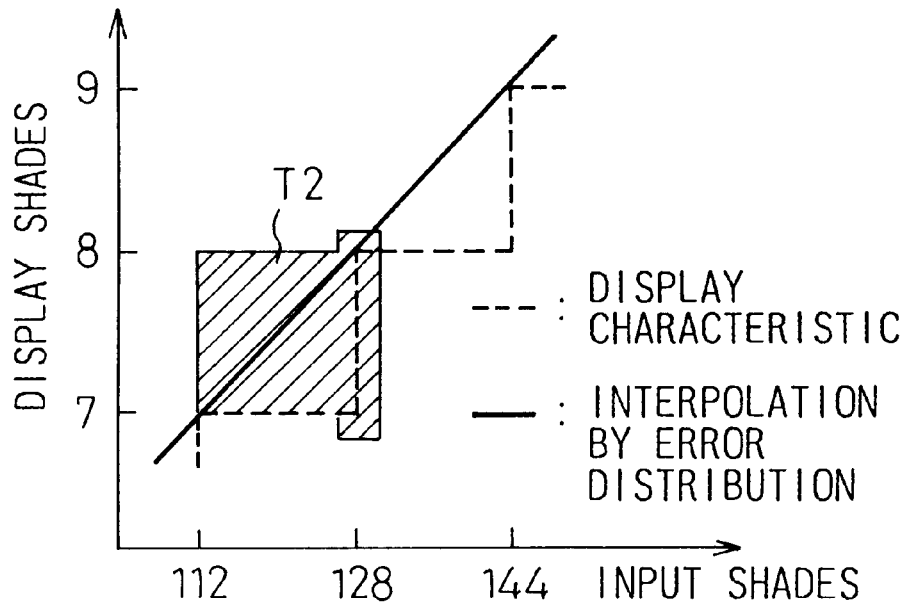
FIG. 9 explains flicker with error distribution.

FIG. 8 shows flicker when no error distribution is carried out. FIG. 9 shows flicker when the error distribution is carried out.

Flicker occurs around shades where subframes to be turned ON vary along a time axis. For example, shade 128 in a 256-shade original image may cause flicker as indicated with a hatched area T1 of FIG. 8 due to a quantization error or video noise when the image is displayed on a 16-shade PDP.

In FIG. 9 with the error distribution, flicker occurs in a hatched area T2 because an error between the original and display shades of a given pixel is distributed to peripheral pixels. When the error distribution is not carried out, the 256-shade original image may cause flicker around shade 128 as indicated with the area T1 of FIG. 8. On the other hand, when the error distribution is carried out, the same original image may cause flicker in the range of shades 113 to 128 as indicated with the area T2 of FIG. 9. In this area T2, shades 113 to 128 of the original image may cause alternation between shades 7 and 8 on the PDP. Namely, the error distribution increases the number of the pixels that flicker.

The error distribution artificially realizes a large number of shades with the small number of shades the PDP can originally display. Accordingly, a fluctuation in shades occurs everywhere in the range of shades. However, flicker sensible to the human eye occurs between specific shades, for example, between shades 7 and 8. Accordingly, changing a combination of subframes may weaken or enhance the flicker.

Now, methods of displaying a halftone image and image processing apparatuses according to the first and second aspects of the present invention will be explained in detail.

Figure 10A:
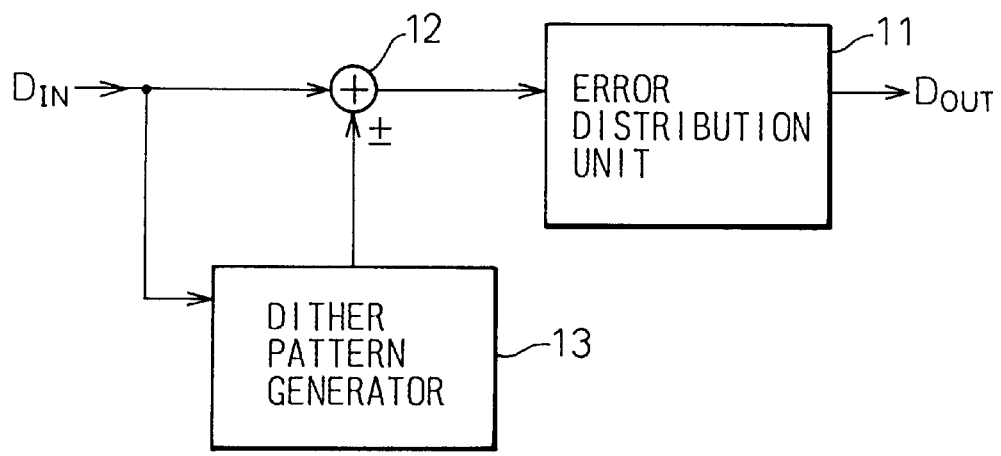
FIG. 10A is a block diagram showing the principle of an image processing apparatus for displaying a halftone image according to the present invention.
Figure 10B:
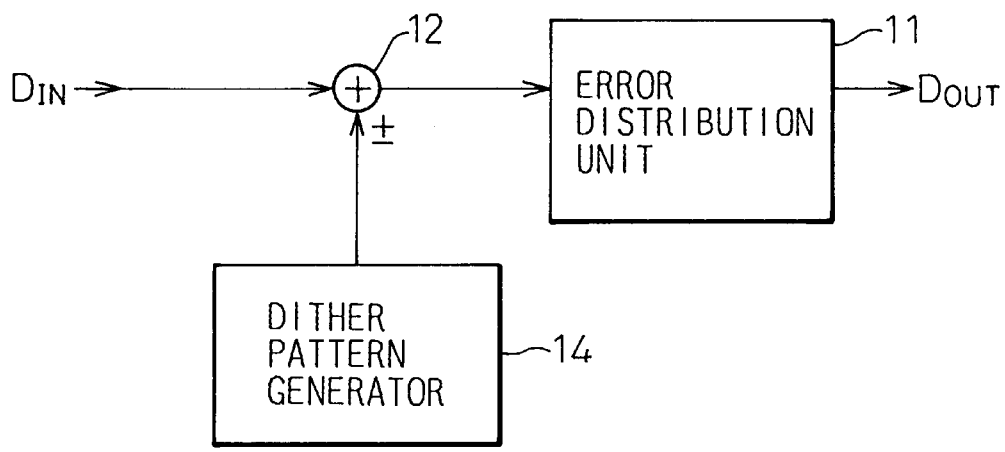
FIG. 10B is a block diagram showing an image processing apparatus for displaying a halftone image according to a prior art.

FIG. 10A is a block diagram showing the principle of an image processing apparatus according to the present invention, and FIG. 10B is a block diagram showing an image processing apparatus according to a prior art. The apparatus of FIG. 10A has an error distribution unit 11, an adder 12, and a dither pattern generator 13. The apparatus of FIG. 10B has a dither pattern generator 14.

The apparatus of FIG. 10A is applied to a display having a two-dimensional matrix of pixels. An input signal Din representing a halftone image is provided for each pixel of the display. According to the input signal Din, the dither pattern generator 13 selects one of the dither patterns prepared in advance. The selected dither pattern is supplied to the adder 12, which adds the dither pattern to the input signal Din. The error distribution unit 11 carries out the error distribution on the dither-pattern-added input signal Din and provides an output signal Dout.

In this way, the present invention selects an optimum dither pattern for the shade the input signal Din represents, and carries out the error distribution according to the input signal Din to which the selected dither pattern has been added. Unlike the prior art that always employs a fixed dither pattern, the present invention is capable of suppressing flicker and peculiar patterns and displaying a halftone image of good quality.

The prior art of FIG. 10B does not supply an input signal Din to the dither pattern generator 14, which provides only a fixed dither pattern.

On the other hand, the present invention of FIG. 10A selects an optimum dither pattern according to the input signal Din and adds the selected one to the input signal Din.

Dither patterns used by the present invention are not limited to specific ones. The threshold of each dither pattern may be optional. Dither patterns to be selected according to input signals may temporally changed at proper intervals. Alternatively, different dither patterns may be selected depending on the positions of pixels of a display.

Unlike the prior art that employs only a fixed dither pattern, or different dither patterns for temporally and spatially different positions without regard to input signals, the present invention selects an optimum dither pattern according to the shade of an input signal and adds the selected one to the input signal. Consequently, the present invention is capable of suppressing flicker and peculiar patterns and providing a halftone image of good quality.

Figure 11:
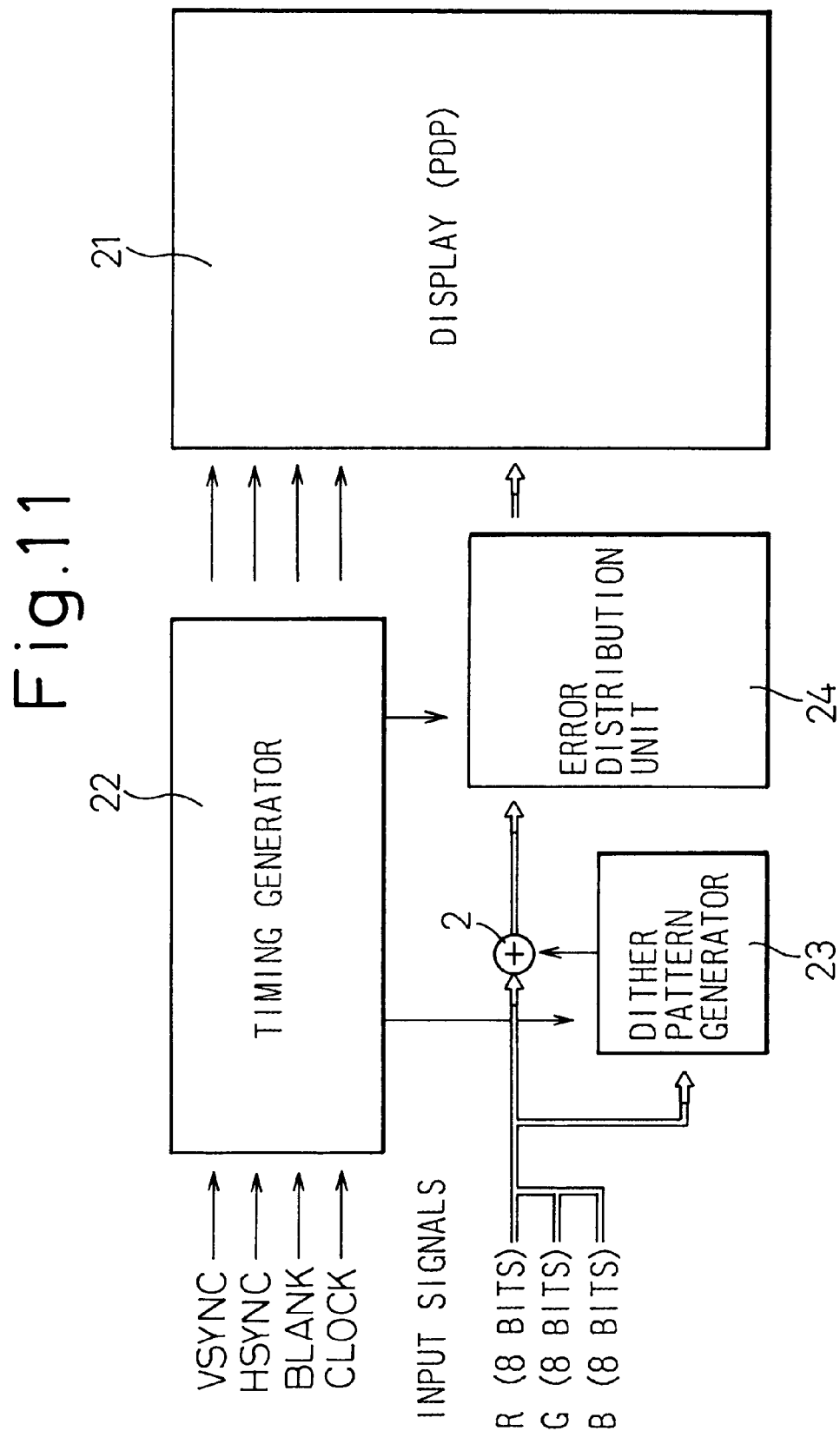
FIG. 11 is a block diagram showing an apparatus for displaying a halftone image according to the present invention.

FIG. 11 is a block diagram showing an image processing apparatus according to an embodiment of the present invention. The apparatus involves a PDP 21, a timing generator 22, a dither pattern generator 23, and an error distribution unit 24.

This apparatus processes input signals before displaying an image on the PDP 21. The dither pattern generator 23 stores a plurality of dither patterns. The timing generator 22 determines the spatial position of a dither pattern according to a clock signal CLOCK, a horizontal synchronous signal Hsync, and a vertical synchronous signal Vsync. The timing generator 22 provides the dither pattern generator 23 with a signal indicating the spatial position of a dither pattern.

The dither pattern generator 23 selects one of the dither patterns stored therein according to an 8-bit input signal provided for each of red (R), green (G), and blue (B) and the signal provided by the timing generator 22. The error distribution unit 24 carries out the error distribution and provides the PDP 21 with a result.

A threshold for the error distribution carried out by the error distribution unit 24 is changed shade by shade, pixel by pixel, or line by line according to an input signal and the signal from the timing generator 22. The total of thresholds provided for each dither pattern is zero.

Figure 12:
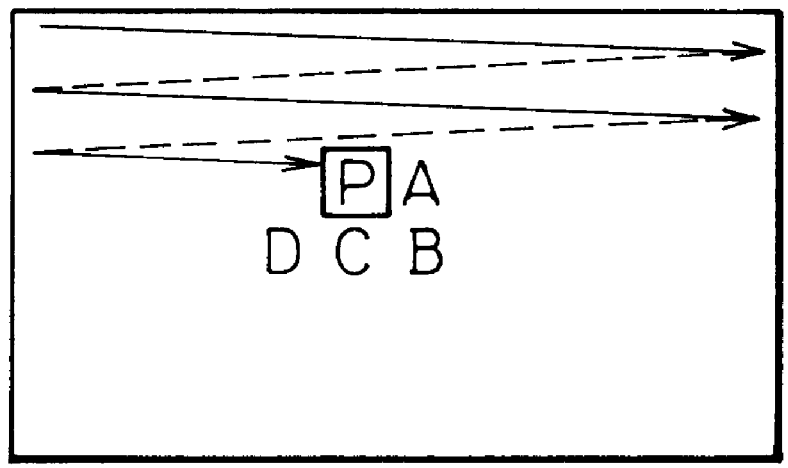
FIG. 12 explains error distribution.
Figure 13:
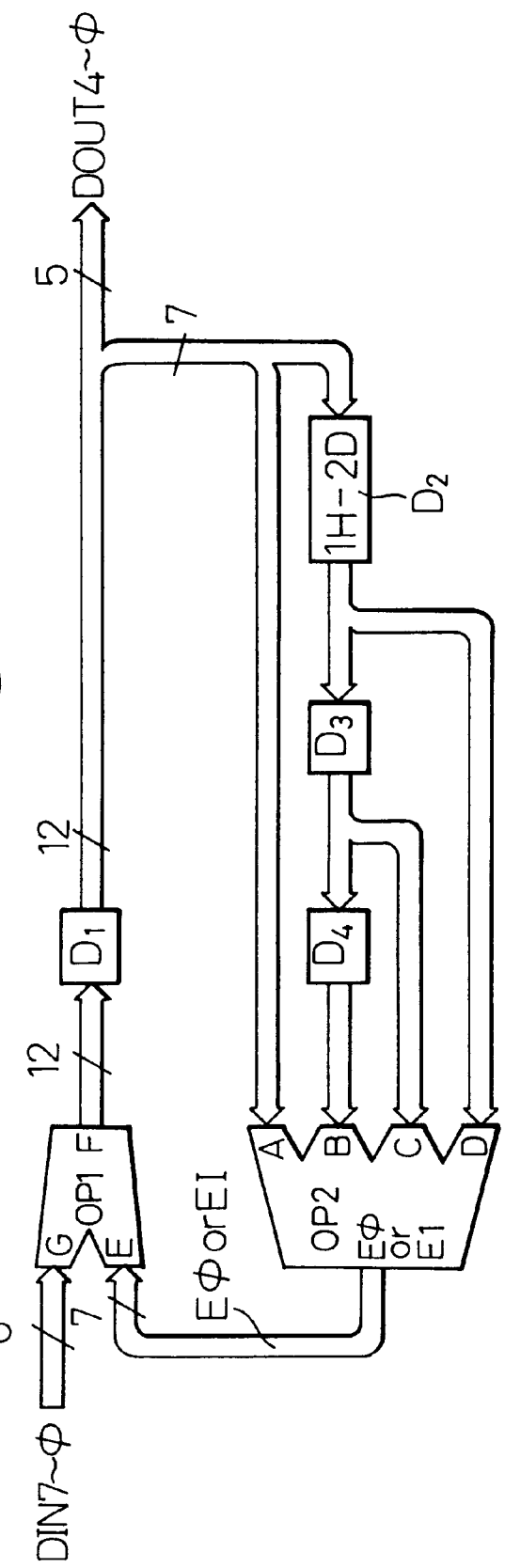
FIG. 13 is a block diagram showing an error distribution unit.

FIG. 12 shows a screen of a PDP for explaining a known error distribution, and FIG. 13 is a block diagram showing a known error distribution unit.

In FIG. 12, each pixel of the PDP receives a display signal. A pixel P belongs to a line n. A pixel A is in the line n and adjacent to the pixel P. Pixels D, C, and B are in the next line n+1 and adjacent to the pixel P. Error data of the pixel P is distributed to the pixels A to D at predetermined ratios.

In FIG. 13, the error distribution unit has an operation unit OP1 which receives an input signal Din having bits 7 to 0 representing a shade. The output of the operation unit OP1 is supplied to a first delay unit D1 which provides an output signal Dout having bits 4 to 0. The output of the first delay unit D1 is supplied to a terminal D of a second operation unit OP2 through a second delay unit D2, to generate error data distributed to the pixel D. The output of the first delay unit D1 is directly supplied to a terminal A of the second operation unit OP2, to generate error data distributed to the pixel A.

The second delay unit D2 has a one-line two-pixel delay function. The output of the second delay unit D2 is supplied to a terminal C of the second operation unit OP2 through a third delay unit D3, to generate error data distributed to the pixel C. The output of the third delay unit D3 is supplied to a terminal B of the second operation unit OP2 through a fourth delay unit D4, to generate error data distributed to the pixel B.

In the example of FIG. 13, the input signal Din has eight bits to indicate one of 256 shades. On the other hand, the output signal Dout has five bits to indicate one of 32 shades because the display can display only 32 shades. As a result, three bits of the input signal Din are distributed as the error data to the peripheral pixels.

More precisely, the 3-bit error data of the pixel P is distributed to the peripheral pixels through the first to fourth delay units D1 to D4 having coefficients of 7/16, 5/16, 3/16, and 1/16, respectively.

It is preferable to apply the method of displaying a halftone image according to the present invention just before a rise of a bit that represents a relatively high shade, e.g., a shade (4n−1).

The error distribution of FIG. 12 employed by the present invention is a known one that distributes an error of the pixel P to the peripheral pixels A to D with A=(7/16)P, B=(1/16)P, C=(5/16)P, and D=(3/16)P. The error distribution is carried out on pixels from left to right and from top to bottom.

The circuit of FIG. 13 uses lower bits of an input signal as error data and synchronizes the phases of the pixels A to D through the delay units D1 to D4. The second operation unit OP2 distributes the error data to the pixels A to D. If the error data is accumulated to increment the lowest bit of the output signal, the shade represented by the output signal is incremented by one. The remaining error data is fed back to the first operation unit OP1.

Figure 14:
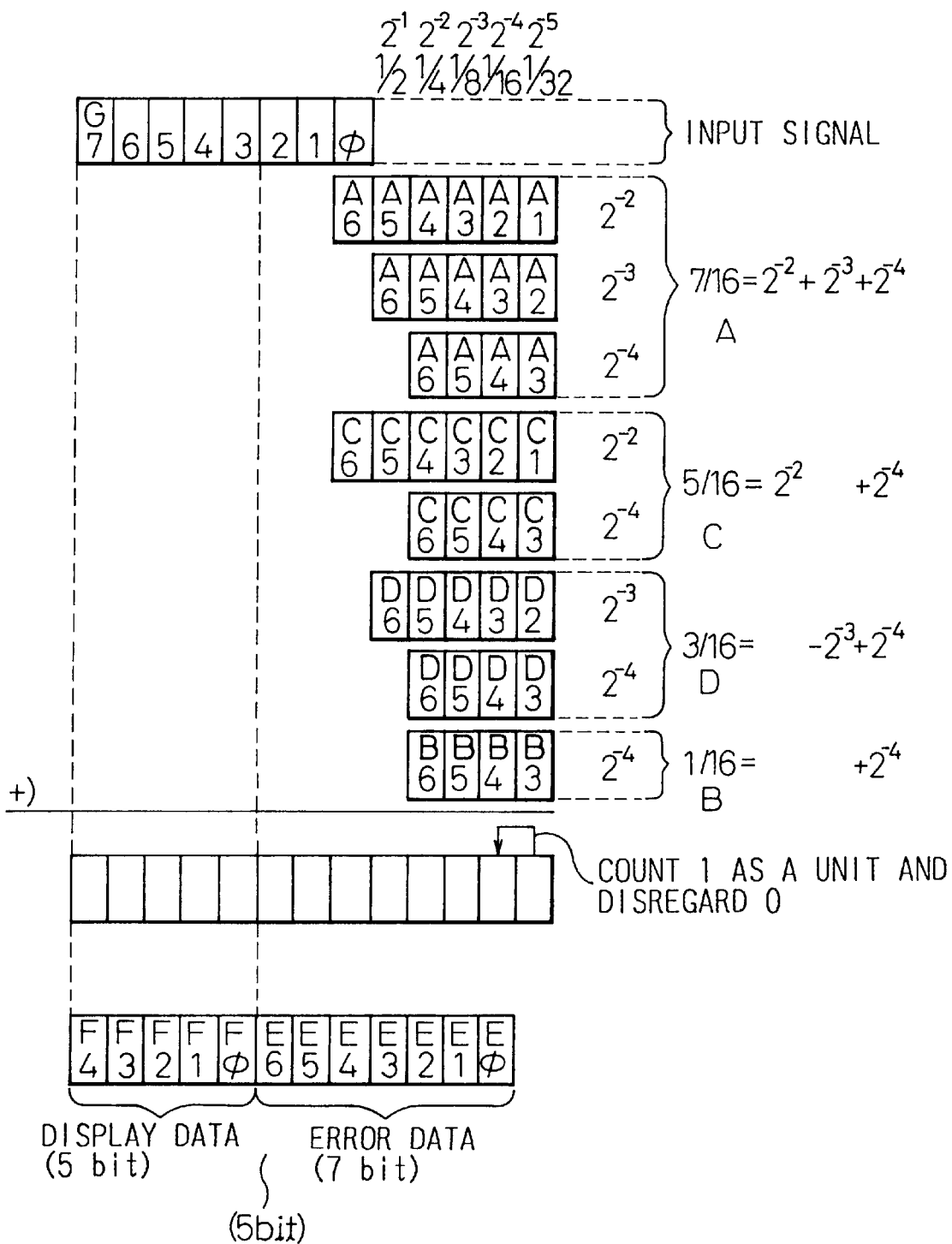
FIG. 14 shows input, output, and error signals used by a method of displaying a halftone image according to the present invention.
Figure 15:
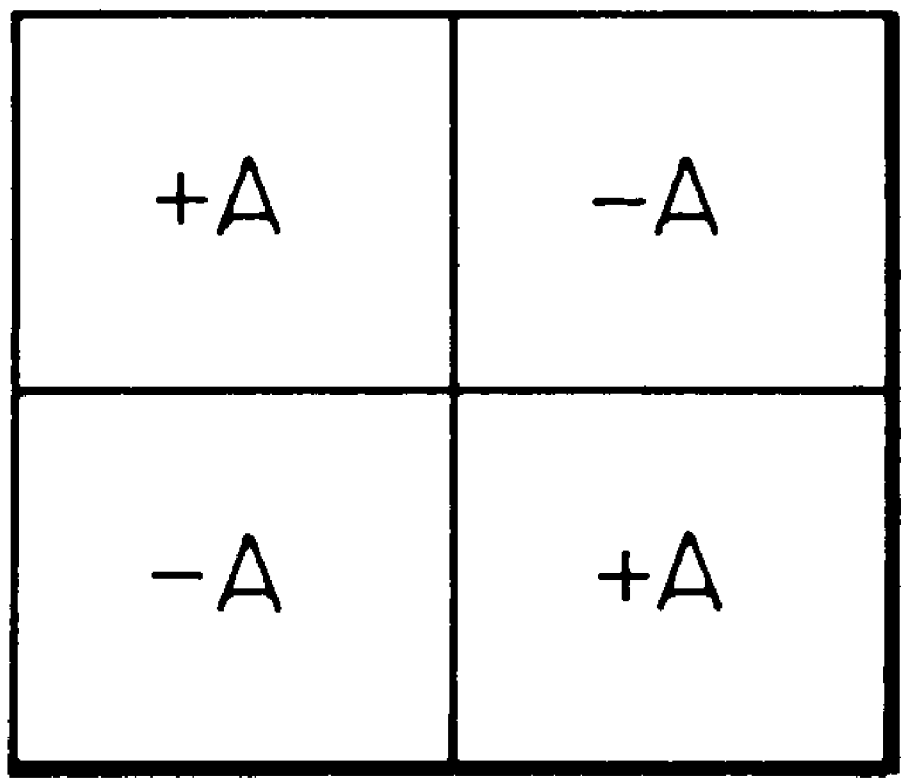
FIG. 15 shows a dither pattern according to the present invention.

FIG. 14 shows examples of an input signal, display data, and error data employed by the method of displaying a halftone image according to the present invention. FIG. 15 shows an example of a dither pattern employed by the present invention.

The dither pattern of FIG. 15 is a zigzag pattern used to change a threshold for incrementing a bit due to an error. Namely, a value A is added to or subtracted from an original threshold. The value A is changed depending on bits to be processed.

In the example of FIG. 14, the input signal has eight bits and the display data involves five bits. The input signal is internally processed with 12 bits. Namely, the error data involves seven bits (12−5=7). When seven bits E6 to E0 of the error data each become 1, the bit F0 of the display data is set. Namely, the bit F0 of the display data is turned ON to artificially express a shade. The value A of FIG. 15 is in the range of ±0 to ±7 and is added to the bits G2, G1, and G0 of the input signal if G0=1. The bits G2, G1, G0 correspond to the bits E6, E5, and E4 of the error data, respectively. Consequently, the bits G2 to G0 may vary between ±(0, 0, 0) and ±(1, 1, 1). The value A is determined according to the five bits G7 to G3 of the input signal.

The dither pattern generator 13 (FIG. 10A) provides the value A, which is added to the input signal Din by the adder 12. Thereafter, the error distribution unit 11 carries out the error distribution. The error data of FIG. 14 involves seven bits to express values below a decimal point, and therefore, 11 or 12 bits are internally handled in total. To express values below a decimal point, data of $2^{-1}$ to $2^{-4}$ or $2^{-5}$ are used.

Dither patterns used by the present invention are stored in advance as a table in a storage unit. An optimum one of them is selected according to an input signal and is supplied to the adder 12.

The adder 12 adds the selected dither pattern to the input signal, to forcibly change the threshold of the error data of the input signal. The threshold is usually 8, and if the value A of FIG. 15 is 2, the dither pattern of FIG. 15 will have alternating thresholds 6 and 10.

Dither patterns employed by the present invention may have different thresholds ranging from 0 to 10. Each dither pattern is not limited to a matrix of 2×2 such as the one shown in FIG. 15 and any matrix is employable.

Dither patterns may have a single threshold or a plurality of thresholds. It is preferable that each dither pattern has two thresholds +A and −A having opposite polarities that are alternately arranged as shown in FIG. 15.

Selecting an optimum dither pattern will be explained. To display shades, a frame is divided into six subframes SF1 to SF6 having different lighting periods that realize shades or intensity levels. Table 2 shows the intensity levels (shades) achieved by the lighting periods of the subframes.

TABLE 2

| Subframe | SF1 | SF2 | SF3 | SF4 | SF5 | SF6 |
|---|---|---|---|---|---|---|
| Intensity Level | 1 | 2 | 4 | 4 | 8 | 8 |

The subframes are arranged in order of SF3, SF5, SF2, SF1, SF6, and SF4.

Figure 17:
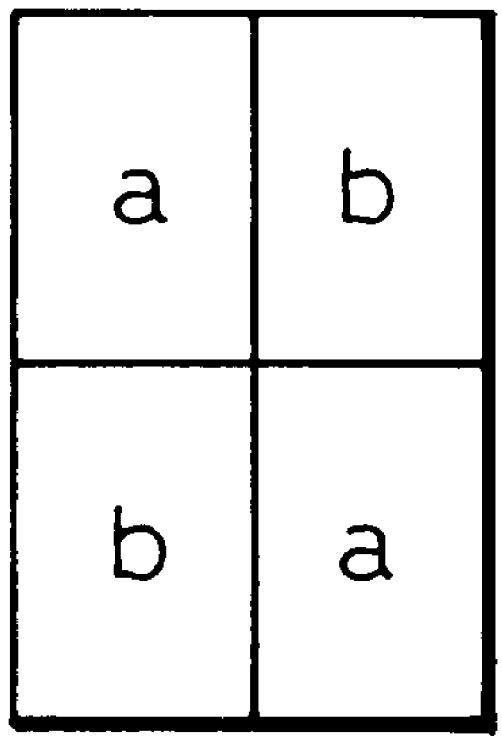
FIG. 17 shows an arrangement of modes according to the method of FIG. 16.

FIG. 16 shows sequences of lighting the subframes according to the present invention, FIG. 17 shows an example of the arrangement of modes a and b of FIG. 16, FIG. 18 shows flicker occurrences according to the lighting sequences of FIG. 16, and FIG. 19 shows the optimum thresholds of dither patterns based on FIG. 18. The modes a and b of FIG. 16 are alternated as shown in FIG. 17. The number of shades the display can originally display is 28 as shown in a column "28GS" of FIGS. 16, 18, and 19. On the other hand, each 8-bit input signal indicates one of 256 shades as shown in a column "256GS" of FIGS. 16, 18, and 19.

Without the dither pattern generator 13 and adder 12, the display causes flicker and peculiar patterns whenever displaying any one of shades 3, 7, 11, 15, 19, and 23 on the 28-shade gray scale as shown in FIG. 18. Flicker usually occurs before turning ON the subframes that provide shades 4 and 8.

According to the sequences of FIG. 16, subframes to be turned ON are quite different between shades 3 and 4 along a time axis. Therefore, when displaying a dynamic image, a pixel that is alternated between shades 3 and 4 may provide an unwanted shade in combination with adjacent pixels. When displaying a still image, a pixel that is alternated between shades 3 and 4 may cause flicker due to different ON timing from adjacent pixels. If no dither pattern is added to an input signal, peculiar patterns will always be displayed. If the peculiar patterns involve horizontal and vertical lines, they will cause horizontal and vertical noise (flicker).

Dither patterns to suppress the horizontal and vertical noise must have different thresholds A (FIGS. 14 and 15) depending on shades. FIG. 19 shows optimum thresholds A for respective shades, obtained according to psychological tests.

Referring to FIG. 19, the threshold A of a dither pattern must be 0, or a dither pattern having a threshold of 0 must be picked out from a storage unit if the shade of an input signal is in the range of 0 to 23 on the 256-shade gray scale, i.e., 0 to 2 on the 28-shade gray scale.

If the input shade is 24 on the 256-shade gray scale, i.e., 3 on the 28-shade gray scale, the threshold A must be 0, or a dither pattern having a threshold of 0 must be picked out from the storage unit. If the input shade is in the range of 25 to 31 on the 256-shade gray scale, i.e., 3 on the 28-shade gray scale, the threshold A must be 3, or a dither pattern having a threshold of 3 must be picked out from the storage unit.

If the input shade is in the range of 32 to 55 on the 256-shade gray scale, i.e., 4 to 6 on the 28-shade gray scale, the threshold A must be 0, or a dither pattern having a threshold of 0 must be picked out from the storage unit. If the input shade is in the range of 56 to 63, i.e., 7 on the 28-shade gray scale, the threshold A must be 0, 1, 1, 4, 3, 4, 1, or 1 for shades 56 to 63 of the 256-shade gray scale, respectively, or a dither pattern having a threshold of 0, 1, 1, 4, 3, 4, 1, or 1 must be picked out from the storage unit for shades 56 to 63 of the 256-shade gray scale, respectively.

In this way, an optimum threshold is set according to the shade on the 256-shade gray scale of an input signal and a corresponding shade on the 28-shade gray scale.

The present invention stores the thresholds A in the storage unit such as a RAM or a ROM, and according to a shade an input signal represents, selects an optimum one to carry out the error distribution.

Unlike the prior art that employs a fixed dither pattern or changes dither patterns temporally and spatially irrespective of input signals, the present invention adds a dither pattern optimum for the shade of an input signal to the input signal. The present invention, therefore, suppresses flicker and peculiar patterns, to provide a halftone image of high quality.

The principle of an image processing apparatus according to the first aspect of the present invention will be explained. This apparatus is effective to solve the distortion of a display characteristic.

Figure 20:
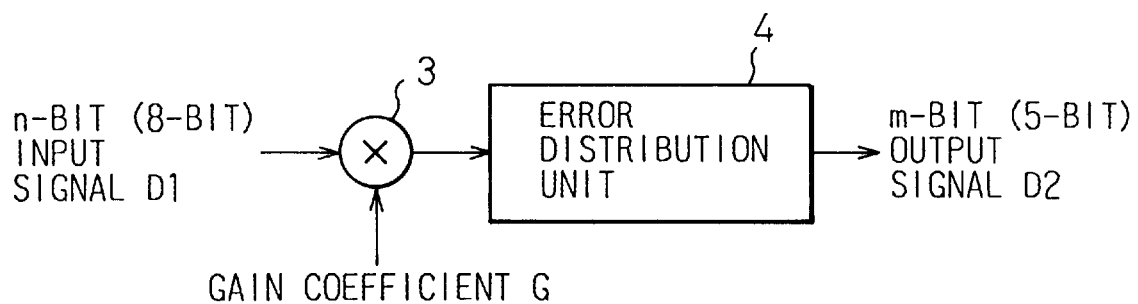
FIG. 20 is a block diagram showing the principle of an image processing apparatus according to a first aspect of the present invention.
Figure 21:
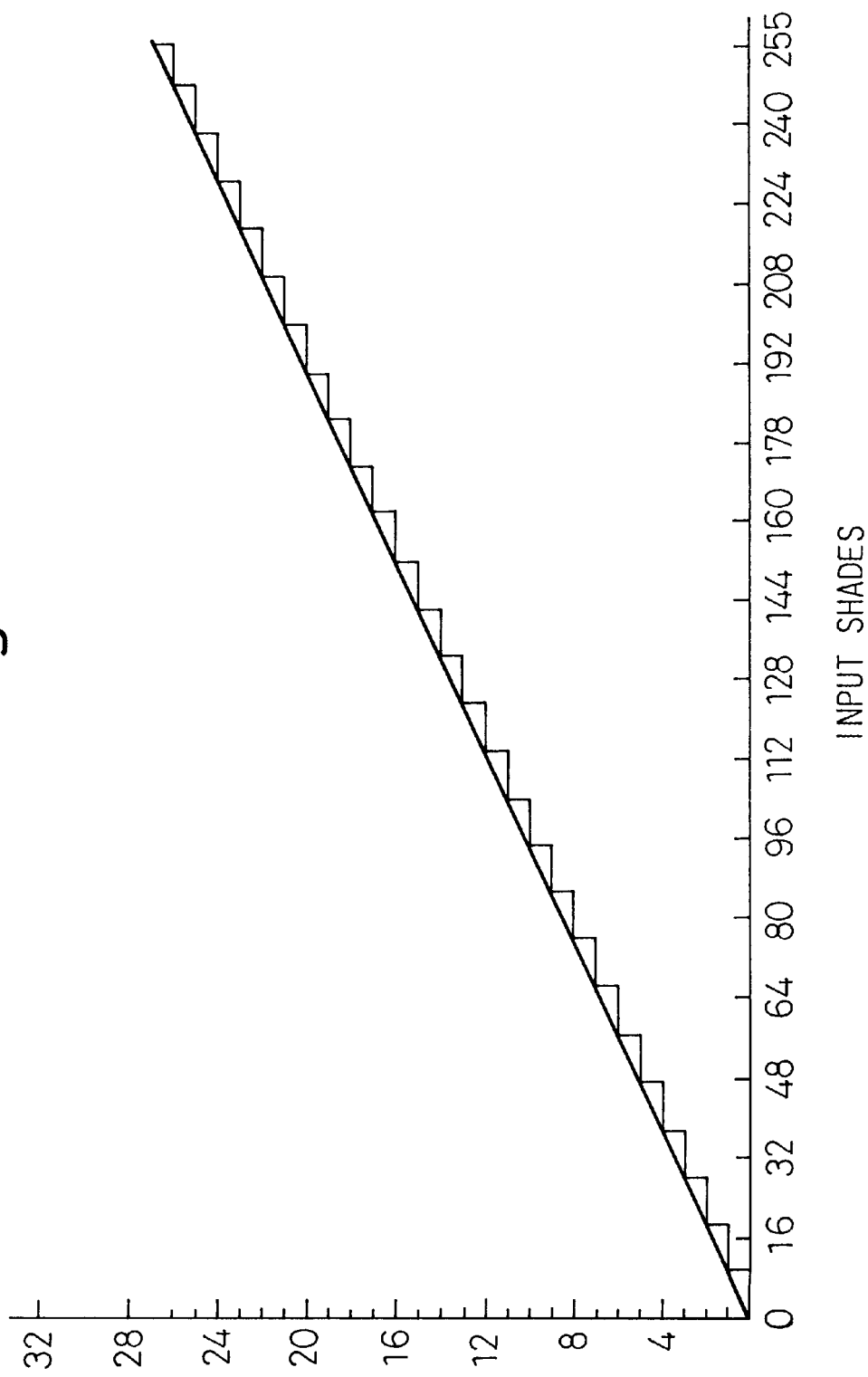
FIG. 21 shows a display characteristic achieved by the apparatus of FIG. 20.

FIG. 20 is a block diagram showing the principle of the image processing apparatus according to the first aspect of the present invention, and FIG. 21 shows the display characteristic of the apparatus.

The apparatus of FIG. 20 has a multiplier 3 disposed in front of an error distribution unit 4. The multiplier 3 multiplies an input signal by a gain coefficient G that is determined according to the number of shades a display can originally display, so that the input signal may be separated into display data and error data at a bit boundary. These data are used for the error distribution. This technique eliminates the saturated part of brightness mentioned above and prevents flatness in the display characteristic that may occur when shades to display are not along a bit boundary.

(1) To eliminate the saturated part of brightness, the gain coefficient G is set to 31×8/255=248/255 with an 8-bit input signal D1 representing one of 256 shades and a 5-bit display signal D2 representing one of 32 shades.

(2) To eliminate the display characteristic flatness that may occur when the number of display shades is not determined along a bit boundary, the gain coefficient G is set to 27×8/255=216/255 with an 8-bit input signal D1 representing one of 256 shades and a 5-bit display signal D2 representing one of 28 shades that are not along a bit boundary. FIG. 21 shows the display characteristic of this case.

In each of these two cases, the higher five bits of the output of the multiplier 3 form display data and the remaining three bits form error data. The output of the multiplier 3 is supplied to the error distribution unit 4, which carries out the error distribution to realize a required display characteristic.

Figure 22:
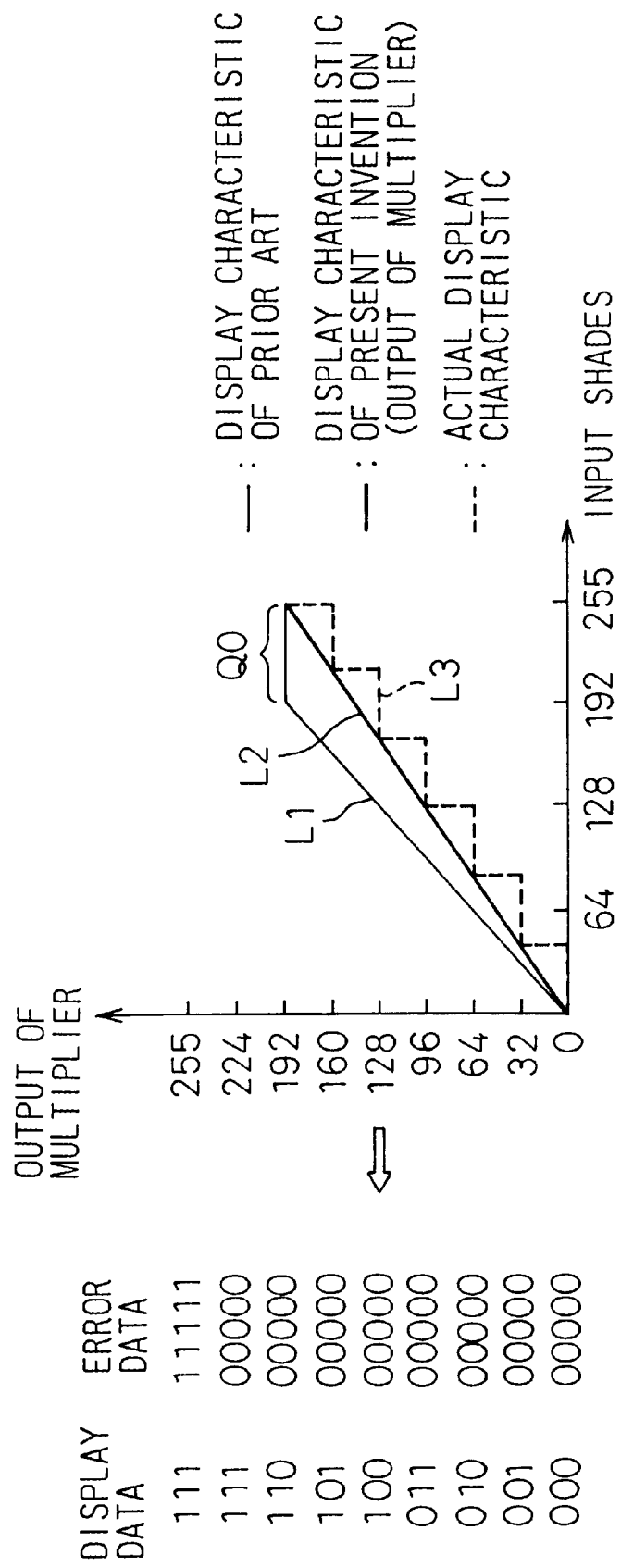
FIG. 22 explains a correction of distortion in a display characteristic achieved by the apparatus of FIG. 20.

FIG. 22 explains a correction of display distortion carried out by the image processing apparatus of the first aspect of the present invention. An input signal to the apparatus represents one of 256 shades, and an output display signal represents one of six shades.

A thin line L1 shows the display characteristic of the prior art, and a thick line L2 indicates the display characteristic of the present invention. The thick line L2 corresponds to the output of the multiplier 3 of FIG. 20. A dotted line L3 indicates actual display shades. The prior art carries out the error distribution directly on the input signal, and therefore, the thin line L1 has flatness (a part Q0 in FIG. 22) that extends for ¼ of the 256-shade scale. On the other hand, the thick line L2 of the present invention has no flatness.

The present invention multiplies the input signal D1 of FIG. 20 by the gain coefficient G, to provide the thick line L2 of FIG. 22. The higher three bits of the input signal are used as display data, and the remaining bits are used as error data. The larger the number of bits of the error data obtained by the multiplication, the smoother the display characteristic the error distribution provides. For example, the error data may consist of five bits.

In this way, multiplying an input signal (D1) by a gain coefficient (G) provides a smooth display characteristic for the entire range of input signals. The output of the multiplier 3 is separated into display data and error data along a bit boundary between higher and lower bits. According to the output of the multiplier 3, the error distribution unit 4 carries out error distribution to artificially provide a halftone image. The present invention eliminates flatness (the part Q0 on the thin line L1 of FIG. 22) intrinsic to the prior art and provides a smooth display characteristic as indicated with the thick line L2 of FIG. 22.

The principle of an image processing apparatus according to the second aspect of the present invention will be explained. This apparatus is capable of solving the flicker problem.

Figure 23:
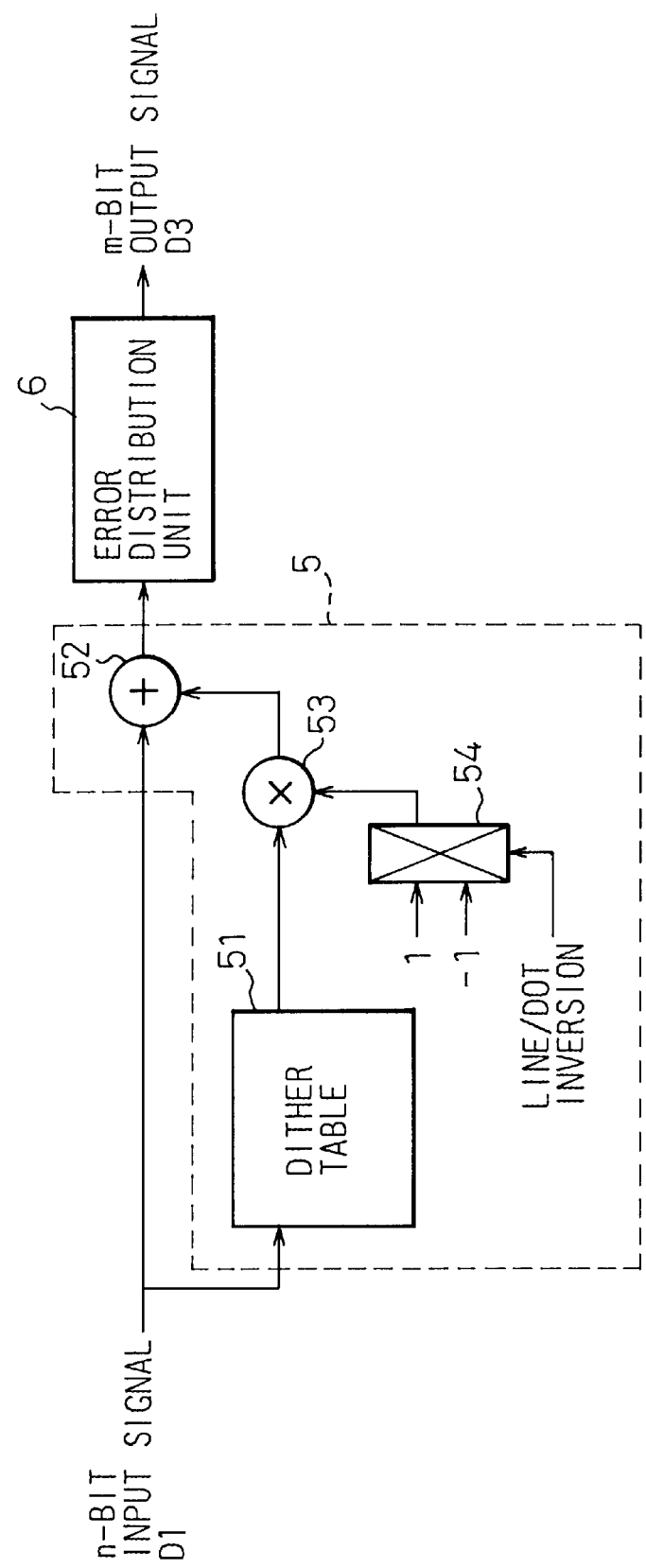
FIG. 23 is a block diagram showing the principle of an image processing apparatus according to a second aspect of the present invention.

FIG. 23 is a block diagram showing the image processing apparatus according to the second aspect of the present invention. The apparatus has a signal processor (dither processor) 5 and an error distribution unit 6. The signal processor 5 has a dither table 51, an adder 52, a multiplier 53, and a selector (switch) 54.

The signal processor 5 is in front of the error distribution unit 6. The dither table 51 receives an input signal D1 and provides a dither value to deal with a shade that may easily cause flicker due to the arrangement and lighting order of subframes. The selector 54 alternately provides 1 and −1 line by line and pixel by pixel. The multiplier 53 multiplies the output of the table 51 by the output of the selector 54. The adder 52 adds the output of the multiplier 53 to the input signal D1. The signal processor 5 provides the error distribution unit 6 with the data including the optimum dither for the shade the input signal represents. As a result, the error distribution unit 6 provides an output display signal that involves minimum flicker.

Figure 24:
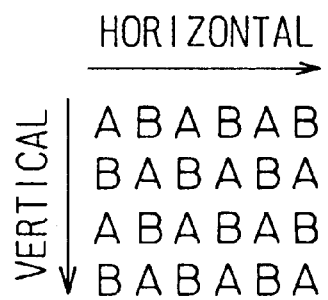
FIG. 24 shows a dither pattern employed by the apparatus of FIG. 23.
Figure 25:
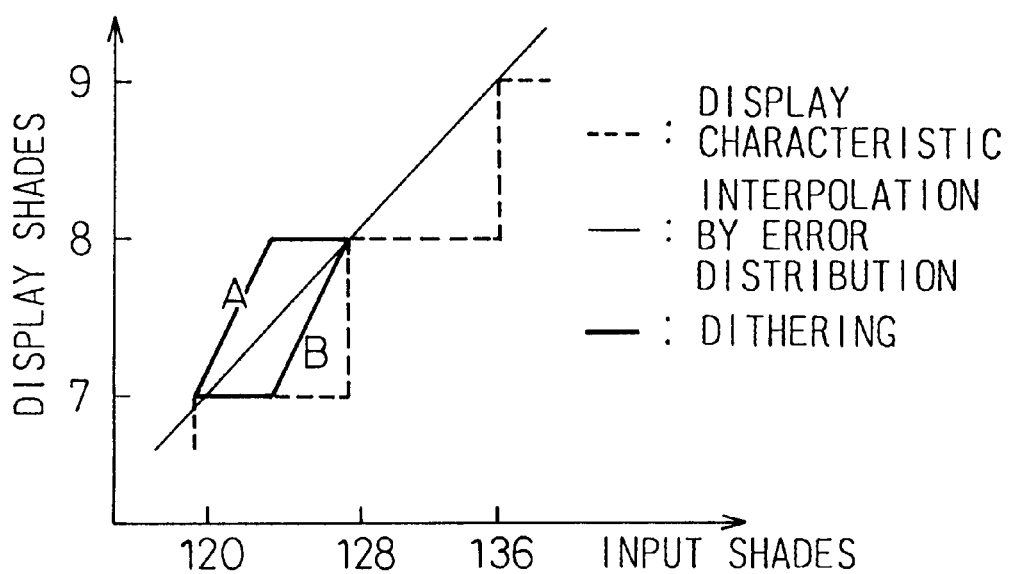
FIG. 25 explains a flicker suppressing action achieved by the apparatus of FIG. 23.

FIG. 24 shows a dither pattern employed by the image processing apparatus of the second aspect of the present invention. FIG. 25 explains the suppressing of flicker achieved by the image processing apparatus of the second aspect of the present invention. In FIG. 25, a frame includes five subframes whose lighting periods are 1:2:4:8:16 to provide 32 shades ranging from shade 0 to shade 31. An input signal represents one of 256 shades ranging from shade 0 to shade 255. The second aspect of the present invention carries out the error distribution on the input signal, to artificially display a halftone image. In this case, the probability of causing flicker is 32.8% as will be explained later in detail.

Although any one of shades 0 to 31 has this probability of causing alternation, i.e., flicker between shades N and N+1, the human eye most senses flicker between shades 15 and 16 with shade 15 being realized by lighting the subframes that provide shades 1, 2, 4, and 8, and shade 16 by lighting the subframe that provides shade 16. To prevent such flicker, the present invention provides any pixel that may alternately provide shades 15 and 16 with a dither value.

TABLE 3

| Input Shade | 120 | 121 | 122 | 123 | 124 | 125 | 126 | 127 | 128 |
|---|---|---|---|---|---|---|---|---|---|
| Dither Value A | 0 | 1 | 2 | 3 | 4 | 3 | 2 | 1 | 0 |
| Coefficient | +0 | +1 | +2 | +3 | +4 | +3 | +2 | +1 | +0 |
| Output Display B | 120 15 | 122 | 124 15 or 16 | 126 | 128 | 128 | 128 16 | 128 | 128 |
| Coefficient | −0 | −1 | −2 | −3 | −4 | −3 | −2 | −1 | 0 |
| Output Display | 120 | 120 | 120 15 | 120 | 120 | 122 | 124 15 or 16 | 126 | 128 16 |

All pixels of the PDP are classified into alternating pixels A and B as shown in FIG. 24. Any input signal that represents a shade corresponding to display shade 15 or 16 is provided with a corresponding dither value (the hatched part of Table 3). The dither values are stored in the dither table 51 of FIG. 23. A dither value suitable for the input signal D1 is read out of the table 51. A toggle signal, which is inverted pixel by pixel and line by line, is generated in response to the LSB (least significant bit) of the output of a dot counter or a line counter. In response to the toggle signal, the dither value is added to or subtracted from the input signal D1.

The pixel A to which a dither value is added and the pixel B from which the dither value is subtracted form thick lines A and B of FIG. 25.

As shown in Table 3, the range of input shades 120 to 123 corresponds to the range of display shades 15 to 16. When no dither is applied, the range of input shades 121 to 127 may cause alternation between display shades 15 and 16. When the dither values are applied, the pixel A in the range of input shades 121 to 123 and the pixel B in the range of input shades 125 to 127 may cause alternation between display shades 15 and 16. Consequently, the probability of flicker with the dithering and the error distribution is about half the probability of flicker without the dithering but only with the error distribution.

Image processing apparatuses according to the embodiments of the first aspect of the present invention will be explained. These apparatuses correct the distortion of a display characteristic and provide smooth shades for the entire range of shades.

Figure 26:
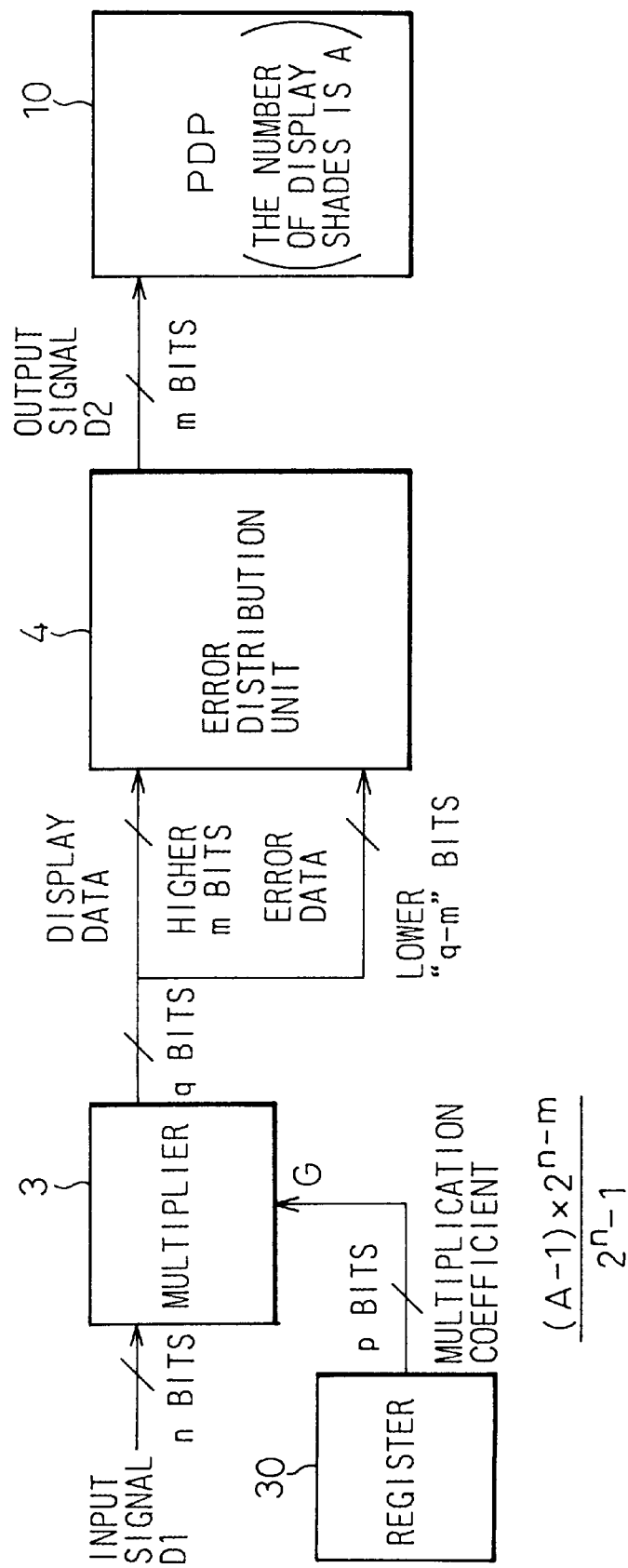
FIG. 26 is a block diagram showing an image processing apparatus according to a first embodiment of the first aspect of the present invention.

FIG. 26 is a block diagram showing an image processing apparatus according to the first embodiment of the first aspect of the present invention. The apparatus has a multiplier 3, an error distribution unit 4, a PDP 10, and a register 30. The apparatus receives an n-bit input signal D1 that represents one of shades 0 to "$2^n-1$." The number of shades the PDP 10 can originally display is A, which is represented with m bits (m<n). Namely, the number A is in the range of "$2^{m-1}+1$" to $2^m$. This apparatus carries out the error distribution to artificially display a halftone image.

The multiplier 3 is arranged in front of the error distribution unit 4. The register 30 stores a multiplication coefficient G, which is supplied to the multiplier 3.

The multiplication coefficient G stored in the register 30 is an optimum one equal to $(A-1) \times 2^{n-m}/(2^n-1)$. The register 30 is made of a programmable latch circuit so that it may serve even if the arrangement of subframes is changed to change the number of shades the PDP 10 can originally display. The number of bits of the register 30 in this embodiment is p. The n-bit input signal D1 is multiplied by the multiplication coefficient G, and the multiplier 3 provides a q-bit output where n<=q<=n+p. In practice, the number q is determined according to a required operation accuracy.

The higher m bits of the q-bit output represent a positive value serving as display data. The remaining bits thereof represent a positive value serving as error data. Accordingly, the error distribution unit 4 carries out only positive-value operations that are easy to carry out. The error distribution unit 4 provides an m-bit display signal that realizes a smooth display characteristic for the entire range of shades.

Figure 27:
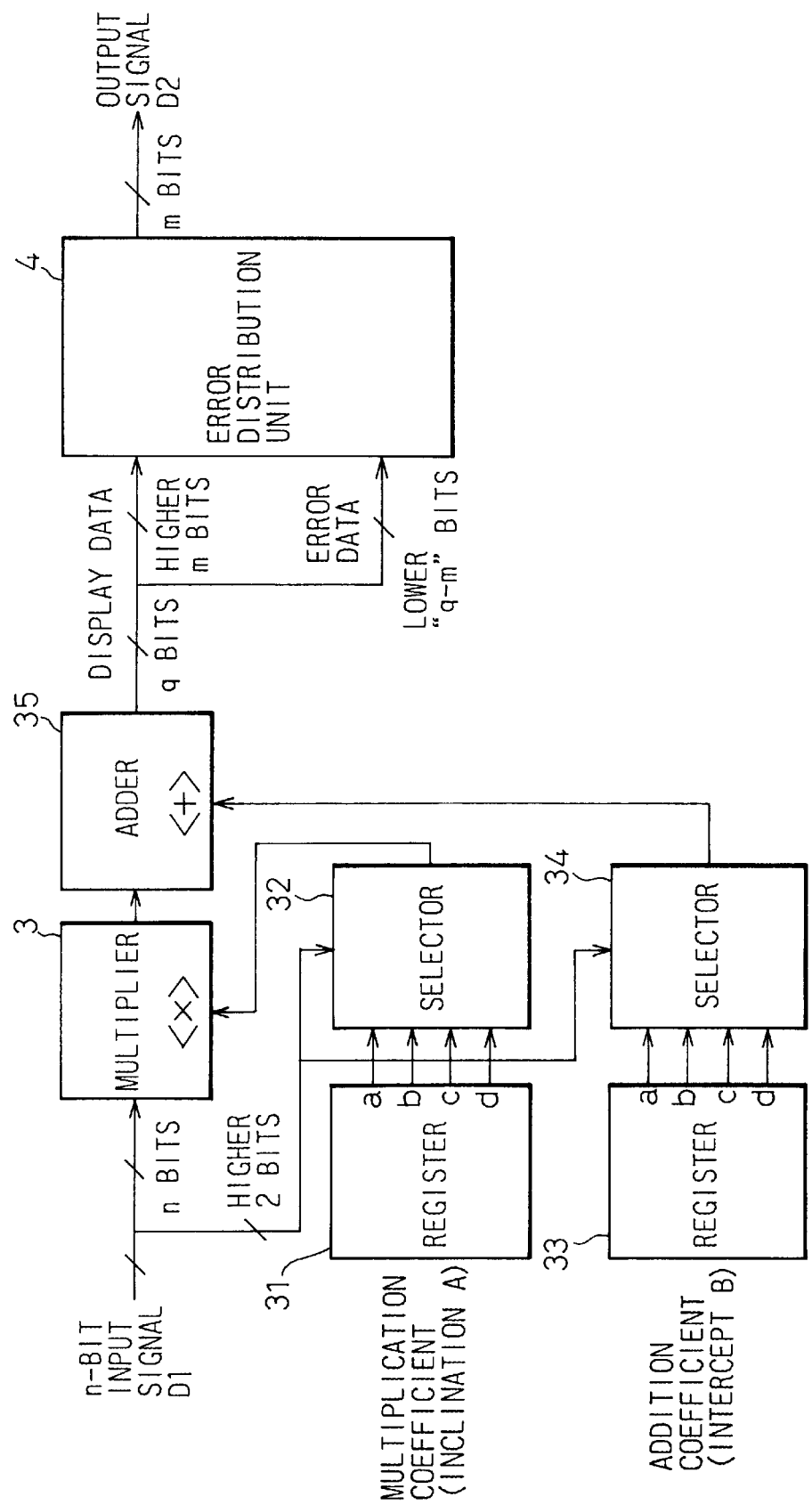
FIG. 27 is a block diagram showing an image processing apparatus according to a second embodiment of the first aspect of the present invention.
Figure 28:
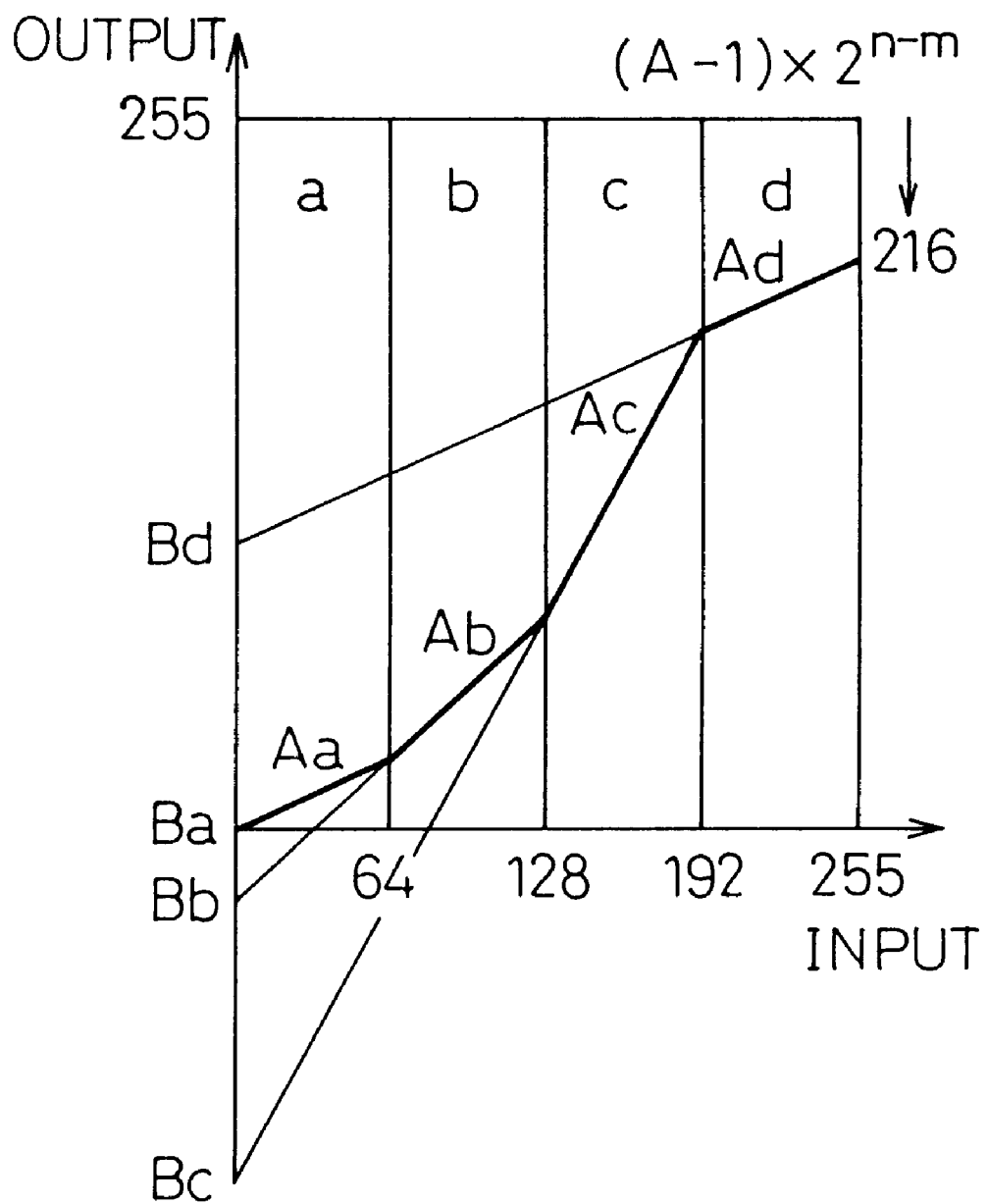
FIG. 28 explains the operation of the apparatus of FIG. 27.

FIG. 27 is a block diagram showing an image processing apparatus according to the second embodiment of the first aspect of the present invention. FIG. 28 explains the operation of the apparatus of FIG. 27. In FIG. 27, a register 31 stores an inclination A ranging from Aa to Ad of a multiplication coefficient G. A register 33 stores an intercept B ranging from Ba to Bd of an addition coefficient. An adder 35 is arranged after a multiplier 3. A selector 32 selects one of the inclinations Aa to Ad stored in the register 31 and supplies it to the multiplier 3. A selector 34 selects one of the intercepts Ba to Bd stored in the register 33 and supplies it to the adder 35. An n-bit input signal indicates one of shades 0 to "$2^n-1$." The apparatus is connected to a PDP. The number of shades the PDP can originally display is A, which is expressed with m bits (m<n). The number A is in the range of "$2^{m-1}+1$" to $2^m$. The display characteristic of this PDP is nonlinear such as γ. The apparatus of FIG. 27 carries out the error distribution to artificially display a halftone image.

The apparatus of FIG. 27 corrects the nonlinearity of the PDP by approximation. The approximation is dependent on the accuracy required of the system. This embodiment employs four straight lines for approximation to correct the nonlinearity of the PDP as shown in FIG. 28. In this embodiment, the PDP is originally capable of displaying 28 shades ranging from shade 0 to shade 27. Namely, the highest input shade 255 represented with an 8-bit input signal is set to $(A-1) \times 2^{n-m} = 27 \times 8 = 216$, and the approximation is made.

Among the four straight lines, a straight line in a region "a" corresponding to the range of shades 0 to 63 has the inclination Aa and intercept Ba. A straight line in a region "b" corresponding to the range of shades 64 to 127 has the inclination Ab and intercept Bb. A straight line in a region "c" corresponding to the range of shades 128 to 191 has the inclination Ac and intercept Bc. A straight line in a region "d" corresponding to the range of shades 192 to 255 has the inclination Ad and intercept Bd.

The inclinations A (Aa to Ad) and intercepts B (Ba to Bd) are stored in the registers 31 and 33, respectively. The registers 31 and 33 are each made of a programmable latch circuit so that they may serve even if the arrangement of subframes is changed to change the number of shades the PDP can originally display. The higher two bits of an input signal D1 determine the inclination A and intercept B. The input signal D1 is multiplied by the inclination A, and the intercept B is added to the result thereof. The inclination A and intercept B may each take a positive or negative value. These variables A and B form an operational expression of $y=Ax+B$. The A and B take different values in the four regions a to d, to correct the nonlinearity of the PDP with the four straight lines. The number of regions and the numbers of inclinations and intercepts stored in the registers are not limited to four of each.

The adder 35 provides a q-bit signal. Among the q bits, higher m bits form a positive value serving as display data, and the remaining bits form a positive value serving as error data. As a result, the error distribution unit 4 may be a simple circuit that carries out only positive-value operations. This embodiment not only corrects the nonlinearity of the PDP but also provides an m-bit output signal D2 having a smooth display characteristic for the entire range of shades without flatness.

Figure 29:
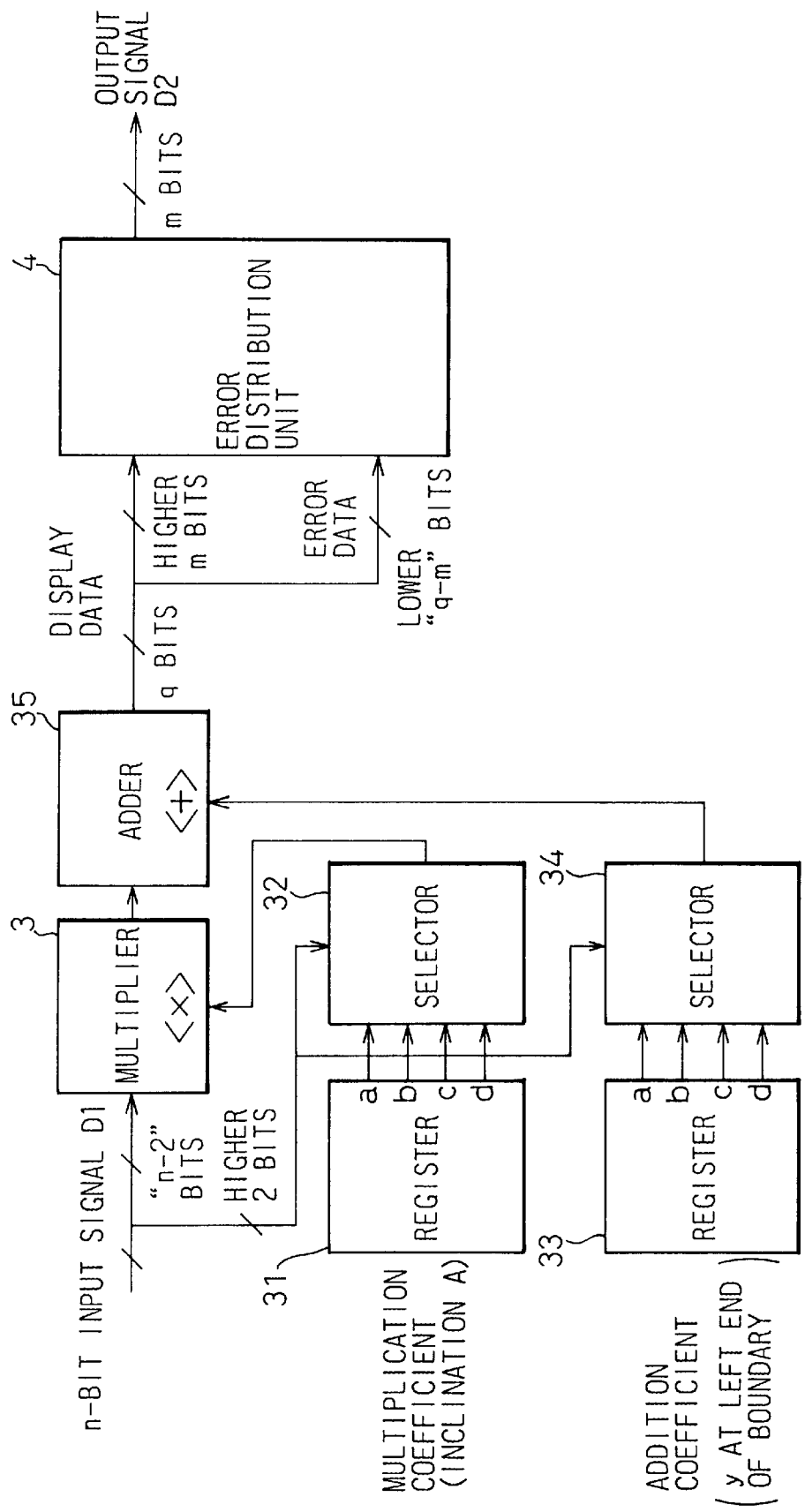
FIG. 29 is a block diagram showing an image processing apparatus according to a third embodiment of the first aspect of the present invention.
Figure 30:
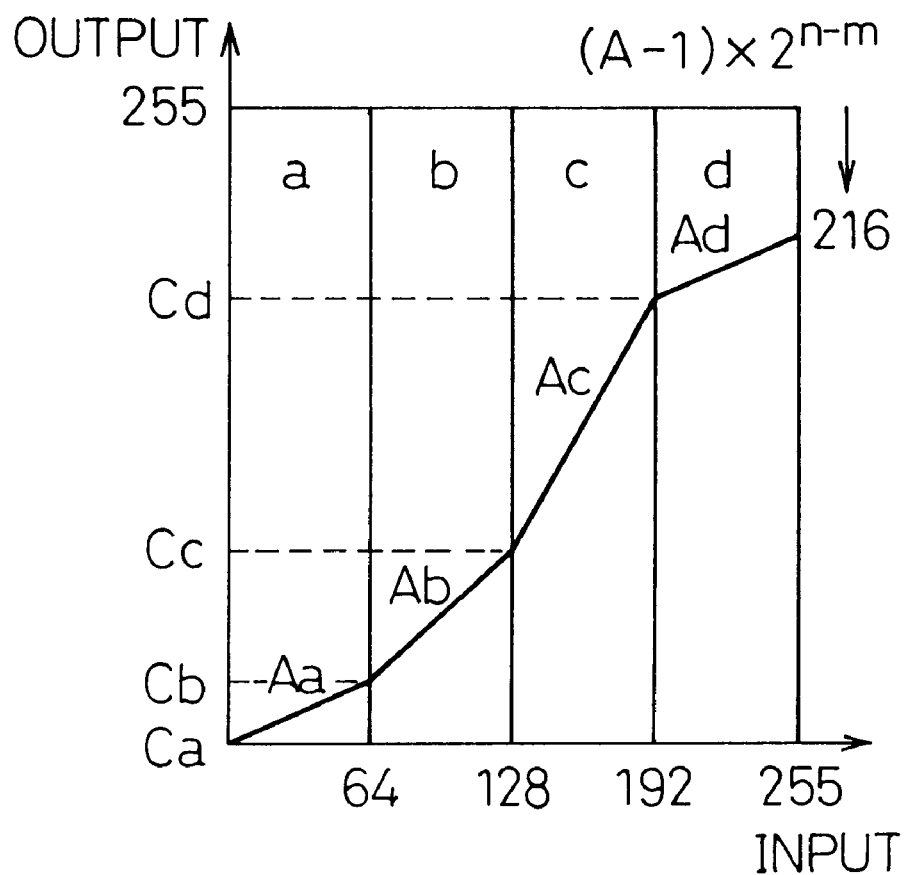
FIG. 30 explains the operation of the apparatus of FIG. 29.

FIG. 29 is a block diagram showing an image processing apparatus according to the third embodiment of the first aspect of the present invention. FIG. 30 explains the operation of the apparatus of FIG. 29.

Similar to the second embodiment, the third embodiment employs four straight lines for approximation to correct the nonlinearity of a display. Unlike the second embodiment that stores inclinations A and intercepts B in the registers 31 and 33, the third embodiment stores inclinations A and the y-values C of the left boundaries of respective regions in registers 31 and 33. For example, the register 33 stores, for the second region b, the y-value Cb of an intersection between a corresponding straight line and shade 64 that forms the left boundary of the region b. As a result, the third embodiment can reduce the number of bits of a multiplicand of a multiplier 3 to "n−2" from n of the second embodiment. This results in simplifying the structure of the multiplier 3.

The third embodiment does not limit the number of regions. For example, it may employ eight regions, i.e., eight straight lines for the approximation. In this case, the number of bits of a multiplicand handled by the multiplier 3 is "n−3" to further reduce the circuit scale.

Figure 31:
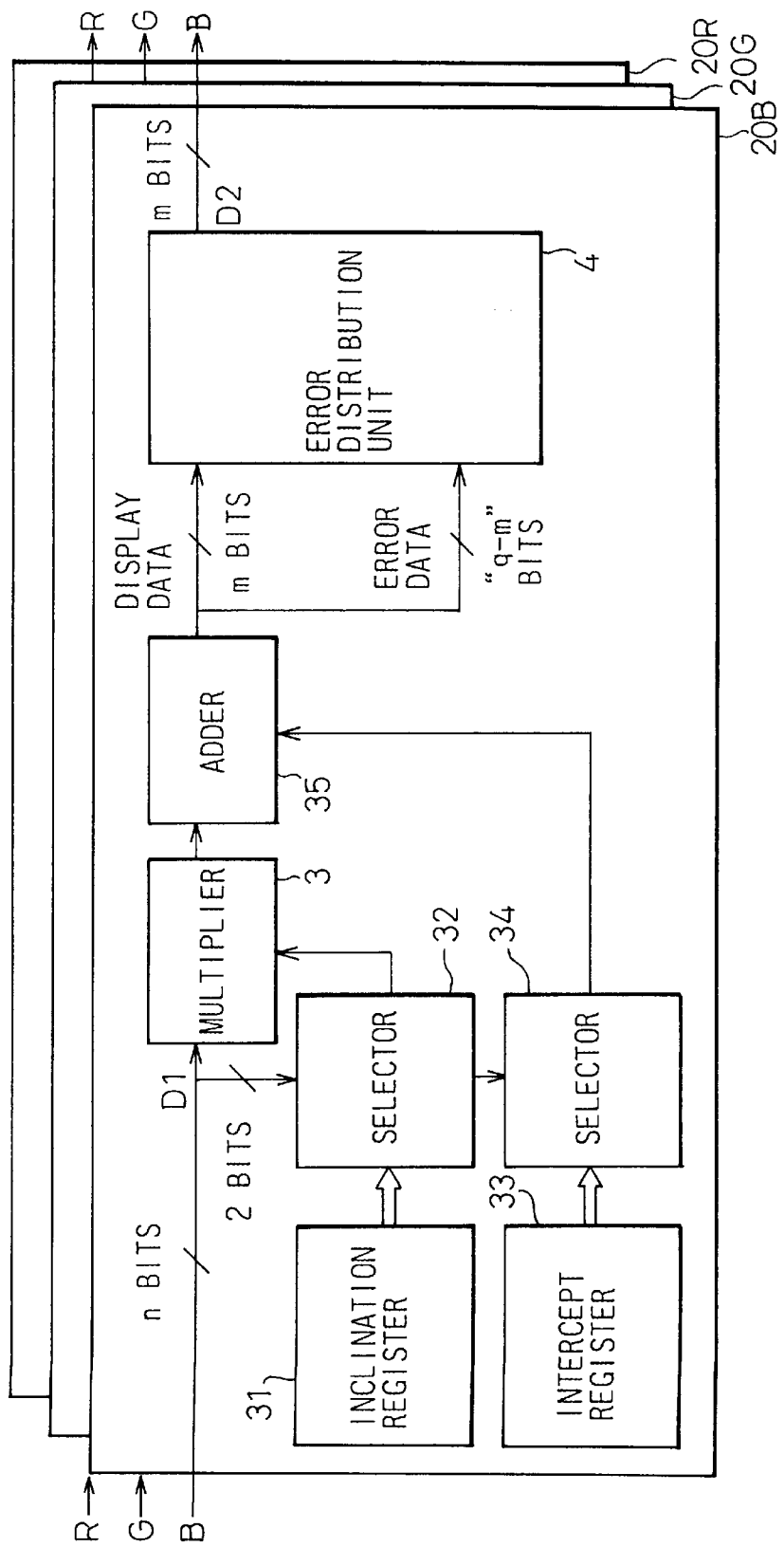
FIG. 31 is a block diagram showing an image processing apparatus according to a fourth embodiment of the first aspect of the present invention.

FIG. 31 is a block diagram showing an image processing apparatus according to the fourth embodiment of the first aspect of the present invention.

This apparatus is applied to a color display using three primary colors, i.e., red (R), green (G), and blue (B). Each of R, G, and B signals is quantized with n bits. The number of shades the display can originally display for each color is expressed with m bits (m<n). The display has different nonlinear characteristics such as γ for R, G, and B, respectively. The apparatus carries out the error distribution to display a halftone image on the display.

The fourth embodiment employs the same circuit as that of the second embodiment of FIGS. 27 and 28 for each of R, G, and B, and carries out the error distribution on each of R, G, and B. The display has different nonlinear characteristics for R, G, and B, respectively, due to fluctuations in the lighting characteristics of fluorescent materials of the display. Accordingly, the fourth embodiment provides R, G, and B with different correction factors. For this purpose, this embodiment provides each of R, G, and B with registers 31 and 33 for storing inclinations A and intercepts B. Each of the R, G, and B circuits of the fourth embodiment may be the same as the third embodiment of FIGS. 29 and 30.

The embodiments of the second aspect of the present invention will be explained. The second aspect carries out the error distribution to artificially increase the number of shades while suppressing flicker due to the error distribution. The flicker and peculiar patterns caused by the error distribution will be explained. Although the following embodiments are explained with reference to an RGB PDP, the second aspect of the present invention, like the first aspect thereof, is not limited to RGB displays or PDPs.

The error distribution will be analyzed.

An 8-bit input signal D1 is separated into 5-bit display data D and 3-bit error data E. Namely, the error data E takes one of the values 0 to 7.

The error data E of peripheral pixels around a given pixel are accumulated, and if the accumulated error data of the given pixel exceeds "8," the least significant bit of the display data of the given pixel is set to 1.

Accordingly, a pixel having error data E=3 will be 8 at a probability of 3/8 and will be 0 at a probability of 5/8.

The probability of occurrence of flicker will be explained.

When subframes to be turned ON widely vary along a time axis between shades to display, flicker occurs. The human eye senses flicker when it occurs at low brightness levels. At high brightness levels, the subframes to be turned ON vary little.

FIG. 32 shows relationships between error data and the probability of occurrence of flicker.

Flicker occurs when the error distribution changes the LSB of the display data D to 1 or 0. Namely, flicker occurs when the accumulation of error data E changes from 8 to 0, or from 0 to 8.

When the error data E=3, the probability P3 of occurrence of flicker is as follows:

$$P3=(3/8)\times(5/8)+(5/8)\times(3/8)=15/32$$

When E=k, the probability Pk of occurrence of flicker is as follows:

$$Pk=k(8-k)/32$$

Table 4 shows the probabilities of occurrence of flicker with respect to different error data.

TABLE 4

| E | Probabitity P |
|---|---|
| 0 | 0/32 |
| 1 | 7/32 |
| 2 | 12/12 |
| 3 | 15/32 |
| 4 | 16/32 |
| 5 | 15/32 |
| 6 | 12/32 |
| 7 | 7/32 |

Accordingly, the probability of occurrence of flicker at an optional shade is 32.8% as follows:

$$\sum_{k=0}^{7} Ek = 84/256 = 32.8\%$$

$$Ek=84/256=32.8\%$$

When this occurs at shades where subframes to be turned ON vary widely along a time axis, the human eye senses flicker.

FIG. 33 explains the probability of occurrence of a change between two events. If an event A occurs at a probability of 40% and an event B at a probability of 60%, the probability of a change from A to B is 4/10×6/10=24/100, the probability of B to A is 6/10×4/10=24/100, the probability of A to A is 4/10×4/10=16/100, and the probability of B to B is 6/10×6/10=36/100.

Consequently, the probability of a state change from A to B, or from B to A is 48%, and the probability of maintaining a state at A (A to A), or at B (B to B) is 52%.

The principle of the second aspect of the present invention will be explained. In Table 4, error data of, for example, E=4 has a high probability of causing a change in the LSB of display data from 1 to 0 or from 0 to 1. In this case, the second aspect of the present invention changes the error data of E=4 to another that may hardly cause such a change. More precisely, the second aspect adds and subtracts a value to and from two pixels of the display, so that an average of the pixels may provide a required shade.

When displaying an input shade with a dither matrix of shades A and B, each of the shades A and B must cause little flicker. To achieve this, the second aspect of the present invention adds ±Z to the input shade.

Figure 34:
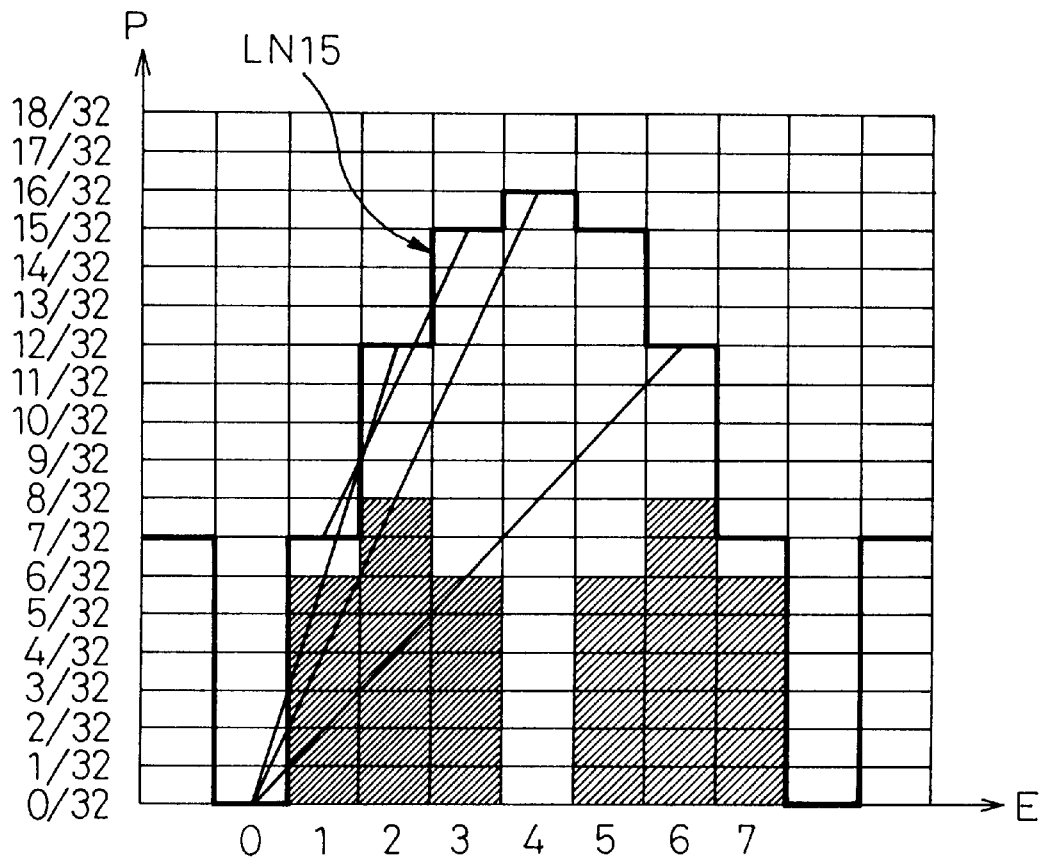
FIG. 34 explains reducing flicker according to the second aspect of the present invention.

FIG. 34 explains the technique of suppressing flicker according to the second aspect of the present invention.

A thick line LN15 shows the probability of occurrence of flicker of the error data E of Table 4 without flicker suppression.

Several kinds of Z are prepared to express the error data E with E±Z. E+Z and E−Z are connected to each other with a straight line. Among intersections between the straight line and the original error data E, one that involves a smallest value of P (the probability of causing flicker) is selected as a flicker suppressing optimum dither value.

TABLE 5

| E | A, B | Z | |
|---|---|---|---|
| 0 | 0, 0 | (0 ± 0) | 0 |
| 1 | 0, 2 | (1 ± 1) | 1 |
| 2 | 0, 4 | (2 ± 2) | 2 |
| 3 | 0, 6 | (3 ± 3) | 3 |
| 4 | 0, 8 | (4 ± 4) | 4 |
| 5 | 2, 8 | (5 ± 3) | 3 |
| 6 | 4, 8 | (6 ± 2) | 2 |
| 7 | 6, 8 | (7 ± 1) | 1 |

Figure 35:
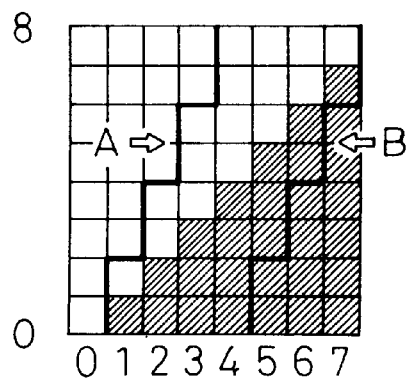
FIG. 35 shows relationships between error data and flicker before and after the flicker reduction technique of FIG. 34.

FIG. 35 shows relationships between error data and the probability of occurrence of flicker with the flicker suppressing technique of FIG. 34.

According to the flicker suppressing technique of the present invention, the values A and B will be as follows:

P=A+B

A=1/16×1/32 (0+12+16+12+0+0+0+0)

B=1/16×1/32 (0+0+0+0+0+12+16+12)

The probability of occurrence of flicker is P=40/256=15.6%. A probability of 15.6% of the present invention is less than half a probability of 32.8% of the present invention without the flicker suppressing technique.

Flicker suppression with a dither matrix of N pixels will be considered.

The technique mentioned above employs dither patterns each involving two values of ±Z. Four- or eight-value dither patterns may be employed. These dither patterns may more effectively suppress flicker than the two-value dither patterns.

Examples of 4-value 2-by-2 dither matrixes are as follows:

| [0] | [1] | [2] | [3] | [4] | [5] | [6] | [7] |
|---|---|---|---|---|---|---|---|
| 00 | 10 | 20 | 20 | 20 | 20 | 20 | 21 |
| 00 | 00 | 00 | 01 | 02 | 12 | 22 | 22 |

Examples of 8-value 2-by-2 dither matrixes are as follows:

| [0]  | [1]  | [2]  | [3]  | [4]  | [5]  | [6]  | [7]  |
|------|------|------|------|------|------|------|------|
| 0000 | 1000 | 1000 | 1010 | 1010 | 0101 | 0111 | 0111 |
| 0000 | 0000 | 0010 | 0100 | 0101 | 1011 | 1101 | 1111 |
| 0000 | 0010 | 0100 | 1001 | 1010 | 0110 | 1011 | 1101 |
| 0000 | 0000 | 0001 | 0100 | 0101 | 1011 | 1110 | 1111 |

FIG. 36 explains another technique of suppressing flicker according to the second aspect of the present invention. A line LN17 indicates the probability of occurrence of flicker without the flicker suppressing technique. Lines L17A and L17B indicate the probabilities of occurrence of flicker according to the flicker suppressing technique employing 2-value dither patterns (A, B) according to the present invention. Lines L17A0, L17A1, L17B0, and L17B1 indicate the probabilities of occurrence of flicker according to the flicker suppressing technique employing 4-value dither patterns (A0, A1, B0, B1) according to the present invention.

Figure 37A:
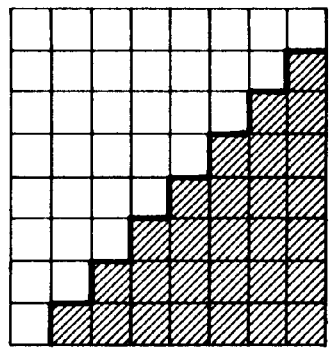
FIGS. 37A to 37D show relationships between error data and flicker before and after the flicker reduction technique of FIG. 36.
Figure 37B:
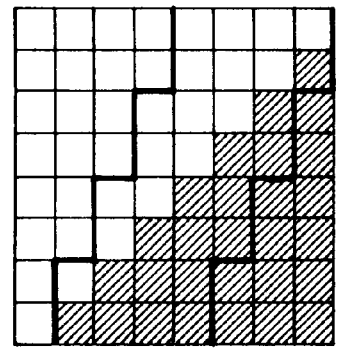
Figure 37C:
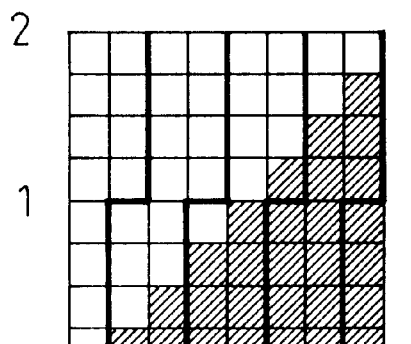
Figure 37D:
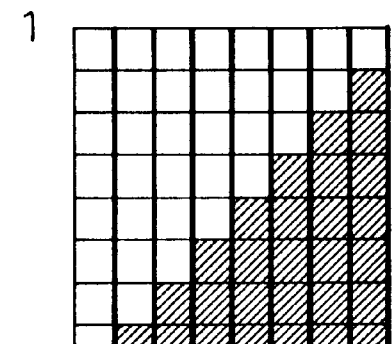

FIGS. 37A to 37D show the relationships between error data and the probabilities of occurrence of flicker before and after the flicker suppressing technique. More precisely, FIG. 37A is without the flicker suppressing technique, FIG. 37B with the technique employing 2-value dither patterns, FIG. 37C with the technique employing 4-value dither patterns, and FIG. 37D with the technique employing 8-value dither patterns.

In FIG. 37A without the flicker suppressing technique, the probability of occurrence of flicker is 32.8%. This is reduced to 15.6% in FIG. 37B with 2-value dither patterns. This is further reduced to 6.2% in FIG. 37C with 4-value dither patterns. This is further reduced to 0% in FIG. 37D with 8-value dither patterns. In this way, 4- and 8-value dither patterns are more effective to remove flicker than 2-value dither patterns.

The embodiments of the second aspect of the present invention will be explained. These embodiments receive an input signal quantized with n bits and drive an RGB display capable of displaying m-bit shades (m<n). The embodiments carry out the error distribution on the input signal to artificially display many shades on the display while suppressing flicker due to the error distribution.

FIG. 38 is a block diagram showing an image processing apparatus according to the first embodiment of the second aspect of the present invention. The apparatus has dither processors 201 to 203 arranged for R, G, and B, respectively, registers 271 and 272, a line counter 273, a dot counter 274, and an exclusive OR gate 275. Each of the dither processors 201 to 203 has selectors 211, 212, and 214, an inverter 213, an adder 215, and an error distribution unit 216.

This apparatus stores different dither types and selects one of them according to an input signal. The apparatus receives 8-bit input signals for R, G, and B, respectively, and provides 5-bit output signals for R, G, and B, respectively. Each of the 5-bit output signals represents one of 17 (shade 0 to shade 16) to 32 (shade 0 to shade 31) shades. The embodiment employs seven dither types plus an off dither state. Each dither type includes eight 4-bit dither values in the range of −15 to 15.

TABLE 6

| REG1 | | |
|---|---|---|
| Display Shade | Input Shade | Dither Type |
| 0 | 0 to 7 | OFF |
| 1 | 8 to 15 | No. 3 |
| 2 | 16 to 23 | OFF |
| 3 | 24 to 31 | No. 1 |
| . | | |
| . | | |
| . | | |
| 31 | 248 to 255 | No. 3 |

As shown in Table 6, the register 271 (REG1) is employed to specify an optimum dither type according to a shade an input signal represents. This embodiment employs seven dither types represented with three bits. The register 271 is a 96-bit register (32×3=96) so that one of the seven dither types is allocated to each of 32 shades. The registers 271 and 272 are each formed of a latch circuit so that the data stored therein can be updated when the arrangement of subframes is changed.

TABLE 7

| | REG2 | | | | | | | |
|---|---|---|---|---|---|---|---|---|
| Error Data | 0 | 1 | 2 | 3 | 4 | 5 | 6 | 7 |
| Dither Type | | | | | | | | |
| No. 1 | 0 | 1 | 2 | 3 | 4 | 3 | 2 | 1 |
| No. 2 | 1 | 1 | 1 | 1 | 1 | 1 | 1 | 1 |
| No. 3 | 0 | 0 | 2 | 4 | 4 | 4 | 2 | 0 |
| . | | | | | | | | |
| . | | | | | | | | |
| No. 6 | 0 | 0 | 0 | 1 | 3 | 1 | 0 | 0 |
| No. 7 | 0 | 0 | 1 | 2 | 3 | 2 | 1 | 0 |

As shown in Table 7, the register 272 (REG2) stores dither values. This register is a 224-bit register (4×8×7) because each dither value is expressed with four bits, each shade region involves eight dither values (corresponding to 3-bit error data), and there are the seven dither types. A required dither process is programmed for these two registers 271 and 272.

Eight-bit input signals for R, G, and B, respectively, are supplied to the dither processors 201, 202, 203, respectively. In each of the dither processors, higher five bits of the input signal are supplied to the selector 211 (SEL1) to form a select signal. The selector 211 is a 3-bit 32-to-1 selector and selects one of the dither types out of the register 271.

A 3-bit dither number provided by the selector 211 and lower three bits of the input signal, i.e., six bits in total are supplied to the selector 212 (SEL2). The selector 212 is a 4-bit 56-to-1 selector with enabled/disabled states. The enabled/disabled states are used to select or not to select a dither off state (dither type No. 0). When the dither type No. 0 is specified, the selector 212 provides data of 0.

The dither value selected according to the shade the input signal represents is inverted or not inverted by the selector 214 (SEL3). Namely, to invert the dither value, the selector 214 selects the output of the selector 212 through the inverter 213. To not invert the dither value, the selector 214 directly receives the output of the selector 212. The selector 214 is a 4-bit 2-to-1 selector. The selector 214 is operated in response to a switching signal provided by the exclusive OR gate 275, which provides an exclusive OR of the LSBs of the outputs of the line and dot counters 273 and 274. Accordingly, the switching signal for the selector 214 is an alternating signal on the screen. The dither value inverted or not inverted by the switching signal as well as the 8-bit input signal are added to each other by the adder 215. Namely, the part encircled with a dotted line in FIG. 38 calculates "input signal±α" with the α being the dither value, i.e., the output of the selector 212.

In this way, this embodiment adds or subtracts a dither value appropriate to an input signal to or from the input signal, to complete the dithering. The processed signal is supplied to the error distribution unit 216. The error distribution carried out by the unit 216 is the same as that mentioned above.

Figure 39:
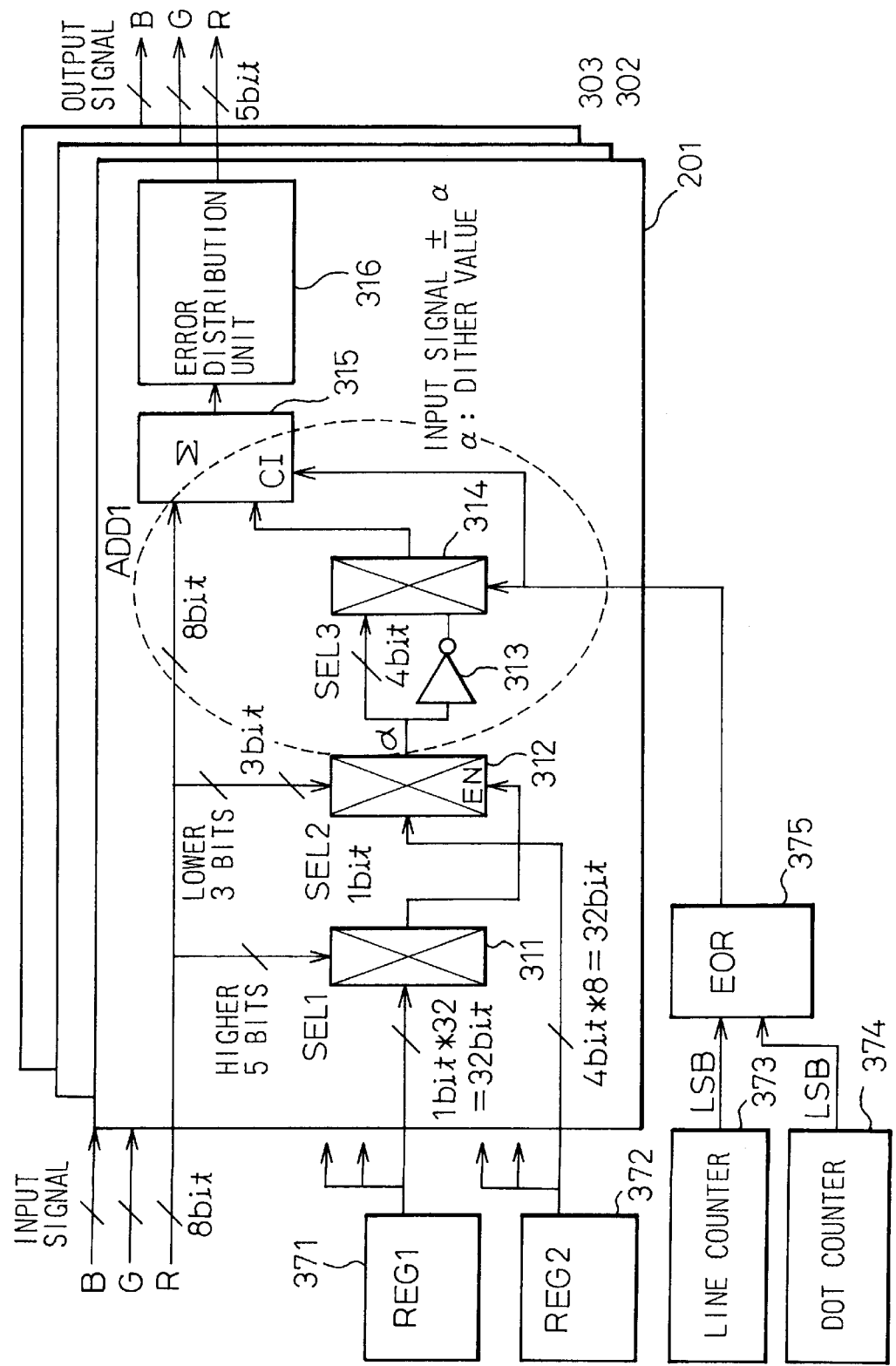
FIG. 39 is a block diagram showing an image processing apparatus according to a second embodiment of the second aspect of the present invention.

FIG. 39 is a block diagram showing an image processing apparatus according to the second embodiment of the second aspect of the present invention. Similar to the first embodiment, the apparatus of the second embodiment has dither processors 301 to 303 for R, G, B, respectively, registers 371 and 372, a line counter 373, a dot counter 374, and an exclusive OR gate 375. Each of the dither processors 301 to 303 has selectors 311, 312, and 314, an inverter 313, an adder 315, and an error distribution unit 316.

The second embodiment employs a single dither type, which is enabled and disabled in response to the level of an input signal. The apparatus receives 8-bit input signals for R, G, and B, respectively, and provides 5-bit output signals for R, G, and B, respectively. Each of the 5-bit display signals represents one of 17 (shade 0 to shade 16) to 32 (shade 0 to shade 31) shades. The dither type is represented with four bits (−15 to 15) and includes eight dither values.

The register 371 (REG1) specifies the enabled/disabled state of the dither values according to the shade an input signal represents. The register 371 is a 32-bit register (32×1) to specify the dither enabled/disabled state for each of 32 display shades. The register 372 (REG2) stores the dither values. The register 372 is a 32-bit register (4×8=32) to store the eight 4-bit dither values. A required dither process is programmed for these two registers 371 and 372.

In this way, the embodiment of FIG. 39 reduces the capacities of the registers 371 and 372, to thereby reduce the circuit scale. The operation of this embodiment is similar to that of the embodiment of FIG. 38 with the register 371 storing a single dither type plus a dither off state instead of the seven dither types, and therefore, the details of the operation of the embodiment of FIG. 39 will not be explained.

FIG. 40 is a block diagram showing an image processing apparatus according to the third embodiment of the second aspect of the present invention.

The third embodiment employs several dither types like the first embodiment and deals with a strong nonlinearity of a display. The first embodiment of FIG. 38 provides each input signal having the same shade with a dither value of ±α, to display an original image represented by the input signal as the sum of two pixels. When a display has a strong nonlinearity, the human eye senses an amplitude difference between a signal to which the dither value α is added and the same signal from which the dither value α is subtracted. Namely, for the human eye, ((input signal+α)+(input signal−α))/2 is not equal to the input signal. This is conspicuous when the dither value is large, or when the nonlinearity is strong, to deteriorate a continuity of shades.

The apparatus of FIG. 40 has dither processors 401 to 403 for R, G, and B, respectively, registers 471 and 472, a line counter 473, a dot counter 474, and an exclusive OR gate 475. Each of the dither processors 401 to 403 has selectors 411, 412, and 414, an inverter 413, an adder 415, and an error distribution unit 416.

The register 472 is used to separately specify a dither value to be added and a dither value to be subtracted. The capacity of the register 472 is twice as large as the capacity of the register 272 of FIG. 38, so that the register 472 may store dither values α (+α) to be added to an input signal as well as dither values β (−β) to be subtracted from the input signal.

More precisely, the register 472 (REG2) is, for example, a 448-bit register (4×8×7×2). The two registers 471 and 472 are programmed for the dither values (α) to be added and dither values (β) to be subtracted, to carry out a required dither process. Except that the capacity of the register 472 is twice as large as that of the register 272 of FIG. 38, the operation of the embodiment of FIG. 40 is the same as that of the embodiment of FIG. 38, and therefore, will not be explained.

FIG. 41 is a block diagram showing an image processing apparatus according to an embodiment of the first and second aspects of the present invention. Namely, the embodiment of FIG. 41 is a combination of the first aspect of FIG. 31 and the second aspect of FIG. 38. The embodiment of FIG. 41 is realized by any combination of one of the embodiments of the first aspect and one of the embodiments of the second aspect.

The embodiment of FIG. 41 carries out the error distribution to artificially display many shades on an RGB display with the number of shades the display can originally display being small. This embodiment is capable of providing smooth shades for the entire range of input shades according to the first aspect of the present invention, and suppressing flicker that may occur on a display such as a PDP that forms shades with a combination of lighting periods, according to the second aspect of the present invention.

This embodiment carries out the process of the first aspect of the present invention and then the process of the second aspect thereof.

The apparatus receives n-bit input signals for R, G, and B, respectively. The number of shades the display can originally display is m (n>m). Circuits 20R, 20G, and 20B according to the first aspect of the present invention of FIG. 31 set a multiplication coefficient so that the maximum input shade may correspond to the maximum display shade. The apparatus changes multiplication and addition coefficients for R, G, and B to realize a uniform display characteristic even if the characteristics of R, G, and B fluorescent materials of the display differ from one another. For this purpose, inclination registers 31 and intercept registers 33 are provided for R, G, and B, respectively.

The circuits 20R, 20B, and 20G provide q-bit output signals (including extended lower bits due to multiplication and addition) to circuits 201, 202, and 203, which are based on the second aspect of the present invention. A sequence of displaying shades on the display is determined in advance, and dithering is carried out on shades that may cause conspicuous flicker.

The arrangement of subframes, i.e., the sequence of displaying shades is the same for R, G, and B, and therefore, a dither value applied to a specific shade may be common for R, G, and B. In each of the circuits 201, 202, and 203, the received signal is separated along a bit boundary into display data and error data. Namely, higher m bits of the signal form positive display data, and lower "q−m" bits thereof form positive error data. As a result, an error distribution unit 216 may be a simple circuit for carrying out only positive sum operations. The embodiment of FIG. 41 corrects the nonlinearity of a display, eliminates a color imbalance, and provides m-bit R, G, and B output signals each having a smooth display characteristic for the entire range of input shades without flatness or flicker.

Although the embodiments of the present invention have been explained with reference to a plasma display panel (PDP), the present invention is not limited to the PDP. The present invention is applicable to any type of display that divides a frame into subframes and carries out error distribution to artificially increase the number of shades to display.

As explained above, the present invention prevents distortion in shades and suppresses flicker on a display such as a PDP that achieves error distribution to artificially increase the number of shades with a small number of shades the display can originally display. In addition, the present invention corrects the nonlinear characteristic of a display as well as a color imbalance in the R, G, and B phosphorescent materials of the display, to thereby provide a high-quality halftone image.

Many different embodiments of the present invention may be constructed without departing from the spirit and scope of the present invention, and it should be understood that the present invention is not limited to the specific embodiments described in this specification, except as defined in the appended claims.

What is claimed is:

1. An image processing device comprising:
    an error distribution unit for carrying out an error distribution operation to artificially increase the number of shades to be displayed on a display; and
    a multiplier for multiplying an input signal by a multiplication coefficient, so that the input signal is separated into display data and error data used for the error distribution operation along a bit boundary and the error distribution operation is carried out on the input signal, to realize a smooth display characteristic for the entire range of input shades.

2. An image processing device as claimed in claim 1, wherein said error distribution unit carries out the error distribution operation on an n-bit-quantized signal (representing an integer in the range of 0 to $2^{n-1}$), so that said display whose original number of shades is represented with m bits (m<n) and is equal to or less than $2^m$ in order to artificially increase the number of shades.

3. An image processing device as claimed in claim 1, wherein said image processing device further comprises:
    a register for storing multiplication coefficients; and
    a selector for selecting an optional one of the multiplication coefficients stored in said register.

4. An image processing device as claimed in claim 1, wherein said image processing device further comprises:
    an adder disposed between said multiplier and said error distribution unit, to add an addition coefficient to the output of said multiplier.

5. An image processing device as claimed in claim 4, wherein said image processing device further comprises:
    a register for storing addition coefficients; and
    a selector for selecting an optional one of the addition coefficients stored in said register.

6. An image processing device as claimed in claim 5, wherein the multiplication and addition coefficients correspond to the inclination and intercept of a linear approximate expression representing an inversion of a nonlinear characteristic of said display and are changed, in response to a specific signal, to correct the nonlinear characteristic of said display.

7. An image processing device as claimed in claim 6, wherein the signal for changing the multiplication and addition coefficients comprises higher bits of the input signal.

8. An image processing device as claimed in claim 5, wherein the addition coefficients stored in said register are y-axis intercepts of $2^h$ linear approximate expressions defined with higher h bits, said higher h bits being included in said display data.

9. An image processing device as claimed in claim 5, wherein the addition coefficients stored in said register are y values on the left edges of $2^h$ rectangular regions defined by higher h bits, said higher h bits being included in said display data, to reduce the number of bits of a multiplicand handled by said multiplier from n to "n−h", to thereby reduce a circuit scale of said image processing device.

10. An image processing device as claimed in claim 1, wherein said multiplier is arranged in front of said error distribution unit.

11. An image processing device as claimed in claim 1, wherein said image processing device is constituted as a semiconductor integrated circuit.

12. An image processing device having processors, for red, green, and blue, respectively, said processors receiving n-bit-quantized red, green, and blue signals, which each represent an integer in the range of 0 to $2^{n-1}$, respectively, and carry out an error distribution operation to artificially display many shades on a display which is originally capable of displaying m-bit shades (m<n) equal to or less than $2^m$ for each of the red, green, and blue, wherein each of said processors comprises:
    a multiplier for multiplying an input signal by a multiplication coefficient;
    a first register for storing the multiplication coefficients;
    a first selector for selecting a proper one of the multiplication coefficients stored in said first register;
    an adder disposed between said multiplier and an error distribution unit, to add an addition coefficient to an output of said multiplier;
    a second register for storing the addition coefficients; and
    a second selector for selecting a proper one of the addition coefficients stored in said second register, each of said processors separating the input signal into display data and error data along a bit boundary, to carry out the error distribution operation and provide a smooth display characteristic for the entire range of input shades.

13. An image processing device as claimed in claim 12, wherein said first and second registers of said processors stored different coefficients for the red, green, and blue, respectively, to correct a color imbalance due to fluctuations in red, green, and blue phosphorescent materials.

14. An image processing device as claimed in claim 12, wherein the multiplication and addition coefficients correspond to an inclination and intercept of a linear approximate expression representing an inversion of a nonlinear characteristic of the display, and are changed in response to a specific signal, to correct the nonlinear characteristic of the display.

15. An image processing device as claimed in claim 14, wherein the signal for changing the multiplication and addition coefficients comprises higher bits of the input signal.

16. An image processing device as claimed in claim 12, wherein the addition coefficients stored in said second register are y-axis intercepts of $2^h$ linear approximate expressions defined with higher h bits.

17. An image processing device as claimed in claim 12, wherein the addition coefficients stored in said second register are y values on the left edges of $2^h$ rectangular regions defined by higher h bits, to reduce the number of bits of a multiplicand handled by said multiplier from n to "n−h"−, to thereby reduce a circuit scale of said image processing device.

18. An image processing device as claimed in claim 12, wherein said multiplier is arranged in front of an error distribution unit.

19. An image processing device as claimed in claim 12, wherein said image processing device is constituted as a semiconductor integrated circuit.

20. An image processing device comprising:
   an error distribution unit for carrying out an error distribution operation to artificially increase the number of shades to be displayed on a display; and
   a dither processor to convert error data, which easily cause a state transition, into data that hardly cause the state transition, to thereby suppress flicker; said dither processor including a dither table for storing dither values to be applied to the input signal that easily causes flicker, and a dithering unit for adding or subtracting the output of said dither table to or from the input signal.

21. An image processing device as claimed in claim 20, wherein said dithering unit comprises:
   a selector for alternately providing inverted and non-inverted signals line by line and pixel by pixel;
   a multiplier for multiplying the output of said dither table by the output of said selector; and
   an adder for adding the output of said multiplier to the input signal.

22. An image processing device as claimed in claim 21, wherein said selector controls inverted and non-inverted signals in response to a signal formed of an exclusive OR of the least significant bit of a line counter and the least significant bit of a dot counter.

23. An image processing device as claimed in claim 20, wherein said dither table comprises:
   a first register for storing a plurality of types of dither values; and
   a second register for specifying an optimum one of the dither values stored in said first register.

24. An image processing device as claimed in claim 23, wherein said first register stores dither values to be added to or subtracted from the input signal.

25. An image processing device as claimed in claim 23, wherein said first register stores first dither values to be added to the input signal as well as second dither values to be subtracted from the input signal.

26. An image processing device as claimed in claim 20, wherein said dither table comprises:
   a first register for storing a single type of dither value; and
   a second register for determining whether or not the dither values stored in said first register must be applied to the input signal, in accordance with the shade of the input signal.

27. An image processing device as claimed in claim 20, wherein said dither processor is disposed in front of said error distribution unit.

28. An image processing device as claimed in claim 20, wherein said image processing device is constituted as a semiconductor integrated circuit.

29. An image processing device having processors for red, green, and blue, respectively, said processors receiving n-bit-quantized red, green, and blue signals, which represent each an integer in the range of 0 to $2^{n-1}$, respectively, and carrying out error distribution to artificially display many shades on a display which is originally capable of displaying m-bit shades (m<n) equal to or less than $2^m$ for each of the red, green, and blue, wherein each of said processors comprises:
   an error distribution unit for carrying out an error distribution operation to artificially increase the number of shades to be displayed on said display; and
   a dither processor, for adding or subtracting a dither value to or from the n-bit-quantized red, green, and blue signals, to convert error data, which easily cause a state transition, into data that hardly cause the state transition, to thereby suppress flicker.

30. An image processing device as claimed in claim 29, wherein said processors comprise:
   a dither table for storing dither values to be applied to the input signal that easily causes flicker; and
   a dithering unit for adding or subtracting the output of said dither table to or from the input signal.

31. An image processing device as claimed in claim 30, wherein said dithering unit comprises:
   a selector for alternately providing inverted and non-inverted signals line by line and pixel by pixel;
   a multiplier for multiplying the output of said dither table by the output of said selector; and
   an adder for adding the output of said multiplier to the input signal.

32. An image processing device as claimed in claim 31, wherein said selector controls the inverted and non-inverted signals in response to a signal formed of an exclusive OR of the least significant bit of a line counter and the least significant bit of a dot counter.

33. An image processing device as claimed in claim 30, wherein said dither table comprises:
   a first register for storing a plurality of types of dither values; and
   a second register for specifying an optimum one of the dither values stored in said first register.

34. An image processing device as claimed in claim 33, wherein said first register stores dither values to be added to or subtracted from the input signal.

35. An image processing device as claimed in claim 33, wherein said first register stores first dither values to be added to the input signal as well as second dither values to be subtracted from the input signal.

36. An image processing device as claimed in claim 30, wherein said dither table comprises:
   a first register for storing a single type of dither value; and
   a second register for determining whether or not the dither values stored in said first register must be applied to the input signal, in accordance with the shade of the input signal.

37. An image processing device as claimed in claim 29, wherein said signal processor is disposed in front of said error distribution unit.

38. An image processing device as claimed in claim 29, wherein said image processing device is constituted as a semiconductor integrated circuit.

39. A semiconductor integrated circuit comprising:
   a dither pattern generator for storing a plurality of dither patterns in advance and receiving an input image signal and a control signal output from a timing generator in response to input control signals;

an adder for receiving the input image signal and a pattern signal from said dither pattern generator; and an error distribution unit for carrying out an error distribution operation on the output of said adder in response to the control signal from said timing generator.

40. A semiconductor integrated circuit as claimed in claim 39, wherein said semiconductor integrated circuit is used to drive a display having a two-dimensional matrix of pixels to be driven according to the output of said timing generator and the output of said error distribution unit.

41. A display panel comprising:

a timing generator for providing control signals in response to input control signals;

a dither pattern generator for storing a plurality of dither patterns in advance and receiving the control signal from said timing generator as well as an input image signal;

an adder for receiving the input image signal and a pattern signal from said dither pattern generator;

an error distribution unit for carrying out an error distribution operation on the output of said adder in response to the control signal from said timing generator; and a display having a two-dimensional matrix of pixels to be driven according to the output of said timing generator and the output of said error distribution unit.

42. A plasma display panel, having an image processing device, for displaying a shade as an optional combination of subframes having different lighting periods according to weighted bits, wherein said image processing device comprises:

an error distribution unit for carrying out an error distribution operation to artificially increase the number of shades to be displayed on a display; and a multiplier for multiplying an input signal by a multiplication coefficient, so that the input signal is separated into display data and error data used for the error distribution operation along a bit boundary and the error distribution operation is carried out on the input signal, to realize a smooth display characteristic for the entire range of input shades.

43. A plasma display panel, having an image processing device, for displaying a shade as an optional combination of subframes having different lighting periods according to weighted bits, said image processing device including processors for red, green, and blue, respectively, said processors receiving n-bit-quantized red, green, and blue signals, which represent each an integer in the range of 0 to $2^{n-1}$, respectively, and carrying out an error distribution operation to artificially display many shades on a display which is originally capable of displaying m-bit shades (m−n) equal to or less than $2^m$ for each of the red, green, and blue, wherein each of said processors comprises:

a multiplier for multiplying an input signal by a multiplication coefficient;

a first register for storing the multiplication coefficients;

a first selector for selecting a proper one of the multiplication coefficients stored in said first register;

an adder disposed between said multiplier and said error distribution unit, to add an addition coefficient to an output of said multiplier;

a second register for storing the addition coefficients; and a second selector for selecting a proper one of the addition coefficients stored in said second register, each of said processors separating the input signal into display data and error data along a bit boundary, to carry out the error distribution operation and provide a smooth display characteristic for the entire range of input shades.

44. A plasma display panel having an image processing device, for displaying a shade as an optional combination of subframes having different lighting periods according to weighted bits, wherein said image processing device comprises:

an error distribution unit for carrying out an error distribution operation to artificially increase the number of shades to be displayed on a display; and a dither processor to convert error data, which easily cause a state transition, into data that hardly cause the state transition, to thereby suppress flicker; said dither processor including a dither table for storing dither values to be applied to the input signal that easily causes flicker, and a dithering unit for adding or subtracting the output of said dither table to or from the input signal.

45. A plasma display panel, having an image processing device, for displaying a shade as an optional combination of subframes having different lighting periods according to weighted bits, said image processing device including processors for red, green, and blue, respectively, said processors receiving n-bit-quantized red, green, and blue signals, which represent each an integer in the range of 0 to $2^{n-1}$, respectively, and a carrying out error distribution to artificially display many shades on a display which is originally capable of displaying m-bit shades (m<n) equal to or less than $2^m$ for each of said processors comprises:

an error distribution unit for carrying out an error distribution operation to artificially increase the number of shades to be displayed on said display; and a dither processor, for adding or subtracting a dither value to or from the n-bit-quantized red, green, and blue signals, to convert error data, which easily cause a state transition, into data that hardly cause the state transition, to thereby suppress flicker.

46. A method of displaying a halftone image on a display having a plurality of pixels arranged in a two-dimensional matrix configuration, comprising the steps of:

inputting a halftone image data representing a shade and being constituted for each pixel;

adding a dither pattern including two alternate thresholds of opposite polarities to the input halftone image data appropriate therefor; and carrying out an error distribution operation on said dither-pattern-added input halftone image data.

47. A method of displaying a halftone image as claimed in claim 46, wherein a plurality of dither patterns are previously prepared, and at least one of said dither patterns is selected and used in accordance with the input halftone image data.

48. A method of displaying a halftone image on a display having a plurality of pixels arranged in a two-dimensional matrix configuration, comprising the steps of:

inputting a halftone image data representing a shade and being constituted for each pixel;

adding a dither pattern to the input halftone image data appropriate therefor, the dither pattern being selected from a plurality of different types of dither patterns and used in accordance with the input halftone image data at a specific time interval; and carrying out an error distribution operation on said dither-pattern-added input halftone image data.

49. A method of displaying a halftone image as claimed in claim 48, wherein a plurality of dither patterns are previously prepared, and at least one of said dither patterns is selected and used in accordance with the input halftone image data.

50. A method of displaying a halftone image on a display having a plurality of pixels arranged in a two-dimensional matrix configuration, comprising the steps of:

inputting a halftone image data representing a shade and being constituted for each pixel;

adding a dither pattern to the input halftone image data appropriate therefor, the dither pattern being selected from a plurality of different types of dither patterns and used in accordance with the input halftone image data at a plurality of spatial positions; and carrying out an error distribution operation on said dither-pattern-added input halftone image data.

51. A method of displaying a halftone image as claimed in claim 50, wherein a plurality of dither patterns are previously prepared, and at least one of said dither patterns is selected and used in accordance with the input halftone image data.

52. A method of displaying a halftone image on a display having a plurality of pixels arranged in a two-dimensional matrix configuration, for applying to a halftone image data representing the shade just before a shade of $(4n-1)$, where $n$ is a natural number, comprising the steps of;

inputting a halftone image data representing a shade and being constituted for each pixel;

adding a dither pattern to the input halftone image data appropriate therefor; and carrying out an error distribution operation on said dither-pattern-added input halftone image data.

53. A method of displaying a halftone image as claimed in claim 52, wherein the shade just before the shade of $(4n-1)$ is just before a bit representing high brightness.

54. A method of displaying a halftone image as claimed in claim 52, wherein a plurality of dither patterns are previously prepared, and at least one of said dither patterns is selected and used in accordance with the input halftone image data.

* * * * *